United States Patent [19]

Butterworth et al.

[11] Patent Number: 5,457,797
[45] Date of Patent: Oct. 10, 1995

[54] FLEXIBLE MULTI-PLATFORM PARTITIONING FOR COMPUTER APPLICATIONS

[75] Inventors: Paul Butterworth, Berkeley; Joseph Cortopassi, Fremont; Sean Fitts, Hayward, all of Calif.

[73] Assignee: Forte Software, Inc., Oakland, Calif.

[21] Appl. No.: 407,340

[22] Filed: Mar. 22, 1995

[51] Int. Cl.⁶ ..................................................... B06F 9/42
[52] U.S. Cl. .................................. 395/650; 364/DIG. 1; 364/230.3; 364/281.3; 364/280
[58] Field of Search ...................... 395/650; 364/DIG. 1, 364/230.3, 281.3, 281

Related U.S. Application Data

[63] Continuation of Ser. No. 101,411, Aug. 3, 1993, abandoned.

[56] References Cited

U.S. PATENT DOCUMENTS

| | | | |
|---|---|---|---|
| 4,742,467 | 5/1988 | Mosserich et al. | 364/200 |
| 5,056,000 | 10/1991 | Chang | 364/200 |
| 5,261,095 | 11/1993 | Crawford et al. | 395/650 |
| 5,295,222 | 3/1994 | Wadhwa et al. | 395/1 |

FOREIGN PATENT DOCUMENTS 2242293  9/1991  United Kingdom .

OTHER PUBLICATIONS

Nishikawa, H. et al. "Aroma:Language support for distributed objects", Proc. 6th Int. parallel proc. symp. 23–26 Mar. 1992, pp. 686–690.

Jones, A. K. et al, "Task Forces:Distributed Software for Solving Problems of Substantial Size", Proc. 4th Int. Conf. on Software Eng. Sep. 1979, pp. 315–330.

*Primary Examiner*—David K. Moore
*Assistant Examiner*—A. Katbab
*Attorney, Agent, or Firm*—David J. Larwood; Crosby, Heafey, Roach & May

[57] ABSTRACT

A method of partitioning an application program by defining an application program for execution on at least two interconnected computers, selected from at least two classes of computers without considering what specific machine environment will be used at run time. Partitioning includes defining two or more objects as components of the application program, where a first object is capable of execution on one class of computers and a second object is capable of execution on a second class of computers. Once the objects are defined, the method includes selecting an environment for the application program, and partitioning the application by selecting each object to execute on the computer of the corresponding class. A system using the method can generate a default partitioning scheme to partition the application program as a series of partitions, each of which is assigned to a computer among available computing resources. The original partitioning selected by the computer can be modified automatically or by a user.

51 Claims, 16 Drawing Sheets

Logical Application Definition

Partitioned Deployment

Hardware              Software
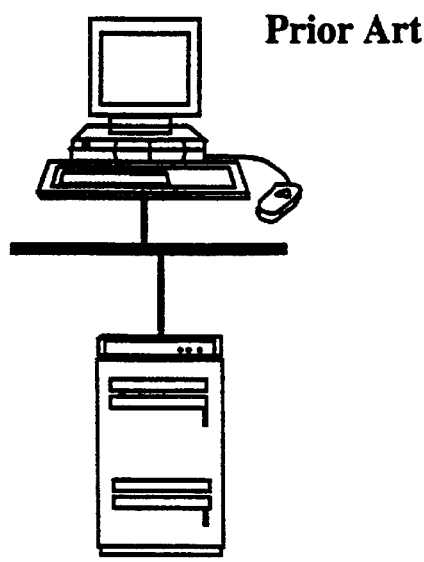
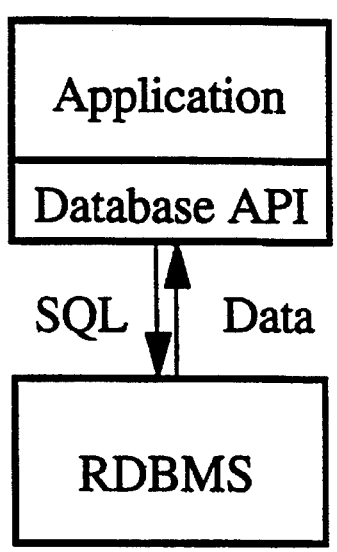
Figure 1A          Figure 1B
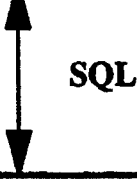
Prior Art
Figure 2

Collection of Services

Procedural Application Logic

Collect Information from Screen
Process Customer Information
  -Get customer info
  -Verify all information
  -Check customer's credit
Check Inventory
  -Get quantity on hand
  -Check against threshold
Enter Order
  -Update order info
  -Update customer info
Notify Shipping
  -Update shipping table

| Forms Painter | 4GL Editor | Repository Browser | Debugger | R E P O S I T O R Y |
|---|---|---|---|---|
| Object-Oriented 4GL | | | | |
| | Portability Abstractions | | | |
| Display | Database | Network | TP Monitor | Middleware | User Defined | |
| Windows Motif Macintosh | Oracle Sybase Rdb Ingres Informix | TCP/IP DECnet Novell AppleTalk | ACMS Tuxedo Transarc | DCE ORB NAS | C++ 3GL | Forté CDD/R PCTE |

FLEXIBLE MULTI-PLATFORM PARTITIONING FOR COMPUTER APPLICATIONS

This is a continuation of application Ser. No. 08/101,411 filed on Aug. 3, 1993, abandoned entitled "Flexible Multi-Platform Partitioning for Computer Applications."

FIELD OF THE INVENTION

The present invention relates to methods and apparatus for partitioning objects of an object-oriented program across multiple computing devices, including real time monitoring and modification of the partitioning.

BACKGROUND OF THE INVENTION

A computer program generally consists of at least three components: a user interface; an application program; and memory or storage. Early computers used tape or card readers and printers for primary user interface. The program or application was loaded to run on the central processing unit and either memory or disc storage or both provided data storage. As the industry matured, computers were able to interact with terminals to provide another important user interface. Small computers, known as workstations, became available to provide a user interface and computing power in the same unit. With the advent of personal computers or PCs, inexpensive computers have replaced simple terminals in many computer installations.

In early computers, a program could reside only in a single computer. Large programs could be broken into segments which could be loaded, as needed, into active memory in the central processing unit. As computers became more powerful, larger programs could be run but the capacity of a single computer remained a fundamental limit for the size of a computer program.

As workstations and PCs became more prevalent, a paradigm evolved which attempted to maximize efficiency by using available processing power in a logical manner. Since many users were interfacing with larger computers through a workstation or a PC, programmers realized that functions required to operate the user interface, such as screen redrawing, video refresh, graphics generation, windowing control (size, position and overlap), and input processing (character and function key handling, interrupts, and such), logically should be handled by software which was resident on the local workstation. Following this same line of reasoning, many programs require extensive access to computer storage. A classic program of this type is a database where a series of records are stored in a special storage area. One database used by many industries is an inventory record. Another database might be for payroll or for accounts payable. Generally, a modern database is composed of a number of records stored in the systems storage area. Multiple users can use the database simultaneously, but there must be provisions to prevent two users from accessing the same record at the same time for then both would be updating old information and possibly making and storing inconsistent changes. Programmers developed server functions which controlled record access for reading or writing information, record locking and, when available memory or storage was limited, specifying media changes such as mounting or unmounting interchangeable media such as discs or tape.

Manipulating graphic information such as windows or menu selection, graphic objects and such generally requires transferring large amounts of information, especially when manipulating bitmaps. If this information must be passed over a common network shared among many computers, then the network can easily be filled with traffic moving graphic images. In a similar way, the low level commands required to select a specific storage media, move the reading heads to the correct portion of the media and pull the information from the media requires a fair amount of activity between the controller and the reading heads when all the user or program really needs is the result, typically some or all of the contents of the requested record.

This paradigm has evolved to be known as a client-server. The server, in general, provides control of and access to one or more shared resources. One useful server is a database server, discussed above. Another useful server is a file server, where the server has access to program or data or other files and can access this information upon request. A print server might store and direct print jobs to a collection of printers which are then accessible to a large number of users through simple calls to this server.

The Evolution of Client-Server

Client-server has grown rapidly with advances in database management system (DBMS) technology and particularly relational database management system (RDBMS) technology. The architectures of the leading multi-user RDBMSs provide a separation between the user-specific work of the application program and the shared data management services of the RDBMS engine. This architecture allows a single RDBMS engine to service multiple applications as well as multiple users of the same application. Structured query language (SQL) provides applications with an easy way of requesting RDBMS services while shielding applications from the details of data management (e.g., concurrency control, backup and recovery, data access strategies).

With the advent of RDBMS networking products, applications could be off loaded from the host and placed on a different machine, using SQL as the protocol to communicate between them. At first, this technology was used between two multi-tasking minicomputers, one that ran the RDBMS engine (the back end) and the other (the front end) that drove the users' dumb terminals. With the growing acceptance of the PC, it was a logical step to replace a multi-tasking front end machine with a collection of PCs, each of which ran its own copy of the front end application program. The growing popularity of the graphical user interface (GUI) has further solidified the appropriateness of client-server, since inexpensive desktop computing cycles can be used to drive the many details of the GUI.

Meanwhile, on the RDBMS server side, the technology has also advanced. RDBMS vendors now offer multi-threaded servers with improved performance and reliability. Some offer stored procedures that can speed the processing of predefined SQL queries. Many also offer gateways to translate the RDBMS vendor's SQL dialect into RDBMSs and file systems from other vendors.

Today, client-server has come to mean PCs running an application program that accesses a shared RDBMS server over a network. Client-server is gaining rapid acceptance among Fortune 1000 companies where is being used today for departmental decision support applications. These companies are very interested in extending the client-server paradigm to enterprise-wide online applications.

Monolithic Client Application Programs

Most client-server developers today accept a predefined division of computing functions between clients and servers. Referring to FIGS. 1A and 1B, with the most commonly used predefined split, clients run the application program which handles the user's display and any application processing of the data that goes into or comes out of the RDBMS. The application program passes SQL to the RDBMS interface (which also runs on the client). The RDBMS interface then ships the SQL across the network to the RDBMS server which processes the request and returns the requested data or a status message back through the RDBMS interface to the application program. According to this model, the application program is monolithic and resides entirely on the client. It is a client application program. This model is sometimes called remote data management because the database is separate from the application program. Other models for splitting functionality between clients and servers are discussed below.

There are many high level tools on the market today for building client application programs. These tools typically include a screen designer and a high level language, often called a 4GL (Fourth Generation Language), for defining application functionality. Most of these tools support rapid prototyping or the ability to build an application as an interactive process of creating a quick prototype and subsequently refining it.

Monolithic client application programs may be well suited for decision support involving a single RDBMS. Running the entire application on the client, however, may present a number of problems for more complicated applications. These problems include:

inadequate processing power on the desktop to drive the entirety of a complex application program slow performance due to excessive network traffic difficulty of interfacing with data sources other than the primary RDBMS and those supported by the RDBMS vendor's gateways minimal reusability of application components among multiple applications Cooperative Processing Application partitioning is best understood in the larger context of cooperative processing (an umbrella term that describes the division of application functionality in a networked environment). It would be incorrect to assume that application partitioning is synonymous with cooperative processing. An understanding of the distinction between these terms can help to illustrate the concept of this invention. To make the distinction, it is first helpful to look at the different styles of cooperative processing as enumerated by the Gartner Group, a market research firm based in Stamford, Conn.

Gartner's classification of cooperative processing styles is based on an application model that includes three different computing functions-user presentation services, application logic, and data management. Listed below are four of the ways for dividing these functions between computers. Each represents a strategy for tackling different application problems, and each is supported by a different set of tools. Together they illustrate some of the alternatives that confront IS managers as they move from stand alone host-based environments to client-server environments.

Remote Data Management. This division of functions places the presentation services and application logic on the client, while the server performs the data management functions. The communication protocol between these components is SQL. See FIG. 2.

Remote data management is a very common model for mainstream database client-server applications where a set of users interact with a desktop application that accesses a shared relational database (RDBMS) sever. This model can operate with a character oriented user interface or a graphical user interface (GUI). Many tools are available today for building applications that utilize this model (e.g., SQL*Forms, Powerbuilder, Uniface, and other 4GLs).

Distributed Presentation. This model, often called "frontware" or "screen scraping," supports a division of functionality within the presentation portion of an application. Distributed presentation takes a traditional mainframe application driving 3270 screens and allows developers to add GUI-based presentation services that run on a PC desktop. See FIG. 3. The 3270 data stream serves as the communications protocol between machines.

Distributed presentation allows organizations to upgrade the user interface to an existing application without altering the application. Several products in the market today support this approach, and they are different products from those that support remote data management.

Distributed Data Management. This model supports a division of functionality within the data management portion of an application. With this model, data can reside on more than one computer, and a distributed data management product will coordinate access to the data wherever it may reside while preserving transparent application access. Referring to FIG. 4, the distributed database knows which tables are on each server and routes requests accordingly.

Distributed data management can be used in conjunction with remote data management where an application running on the client may access data that is distributed across more than one RDBMS server. A few of the RDBMS vendors offer distributed data management products. Applications accessing distributed data can be developed with traditional 4GL tools.

Distributed Function. This model supports application logic that resides on more than one machine. The communication mechanism may be a remote procedure call (RPC) or a more conversational communication mechanism (e.g., IBM's APPC or CPI-C). See FIG. 5.

In their report *Client/Server and Cooperative Processing: A Guide for the Perplexed*, 1991, Gartner Group observes: "The distributed function style is particularly powerful for complex applications that are both highly user-interactive and database I/O intensive. . . . Because the functions reside on the more relevant (local) node, the number of messages that must be sent over the network between A [the client] and B [the server] is minimal, thereby enabling relatively fast response times for complex workloads." Gartner also-observes: "Distributed function applications are inherently the most difficult cooperative processing applications to design and develop, since there are two separately compiled application programs. Developers must analyze thoroughly where each function should reside and what type of dialog must occur between the two programs."

Application partitioning, which is central to the method of this invention, is a technology that simplifies the development of applications using the distributed function model described above. The general client-server paradigm, discussed above, is based on a division of computing functions among two or more nodes in a network. By dividing up computing tasks, client-server supports a flexible and cost effective computing model that may displace traditional host-based computing as the dominant paradigm for the future. Application partitioning goes beyond traditional client-server technology and provides an approach for allocating application functionality among clients and servers.

The allocation of computing functions may present many options, each with implications for performance, control, and/or flexibility. To handle application partitioning effectively, one should consider several issues surrounding the allocation of functions across multiple platforms in the network. The overall goal is to promote more effective client-server applications that can solve emerging business problems.

SUMMARY OF THE INVENTION

The invention provides a system and a method of partitioning an application program. A development programmer defines a logical application definition for an application program by defining two or more objects as components of the application program. This selection is made without considering what specific machine environment will be used at run time.

Once the objects are defined in sufficient detail to allow the application to operate, the application administrator will identify a specific environment for the application program, including at least two interconnected computers. Each object is assigned to a partition and each partition is assigned to a target computer and loaded to allow the application program to run. The system can generate a default partitioning scheme to assist the application administrator with initial partitioning. This results in the application program being partitioned as a series of partitions, each of which is assigned to a computer among available computing resources. The original partitioning selected by the computer can be modified automatically or by a user. Modification can include moving an object from one partition to another or replicating entire partitions. The invention also includes automatic detection of performance bottlenecks in operating the application program and, where appropriate, duplicating one or more objects to run on additional computers in order to enhance throughput or increase reliability in the system.

The application program can be run easily in a new environment by assigning the specific partitions to run on available equipment. A single application program might run within the same company in a variety of different partitioning schemes, based on specific resources and needs in a specific corporate location.

- As client-server evolves from a departmental to an enterprise-wide strategy, application partitioning will be a key strategy.
- Application partitioning is the ability to create a unified application and subsequently break it into a set of modules that execute on different nodes in a networked environment.
- Application partitioning can be an important strategy for increasing performance, control, and flexibility.
- Partitioning leverages the client-server model to support a new generation of enterprise applications.
- Forté was designed as a tool for developing and deploying partitioned applications.

BRIEF DESCRIPTION OF THE DRAWINGS

FIGS. 1A and 1B illustrate a prior art monolithic client application program.

FIG. 2 illustrates a prior art remote data management model.

DESCRIPTION OF THE PREFERRED EMBODIMENTS

Figure 3:
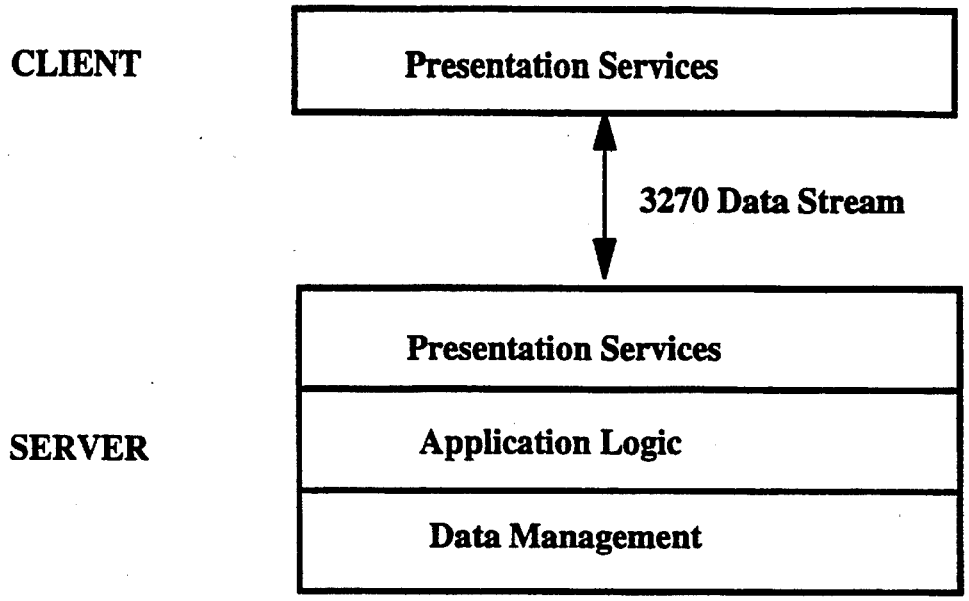
FIG. 3 illustrates a distributed presentation model.
Figure 4:
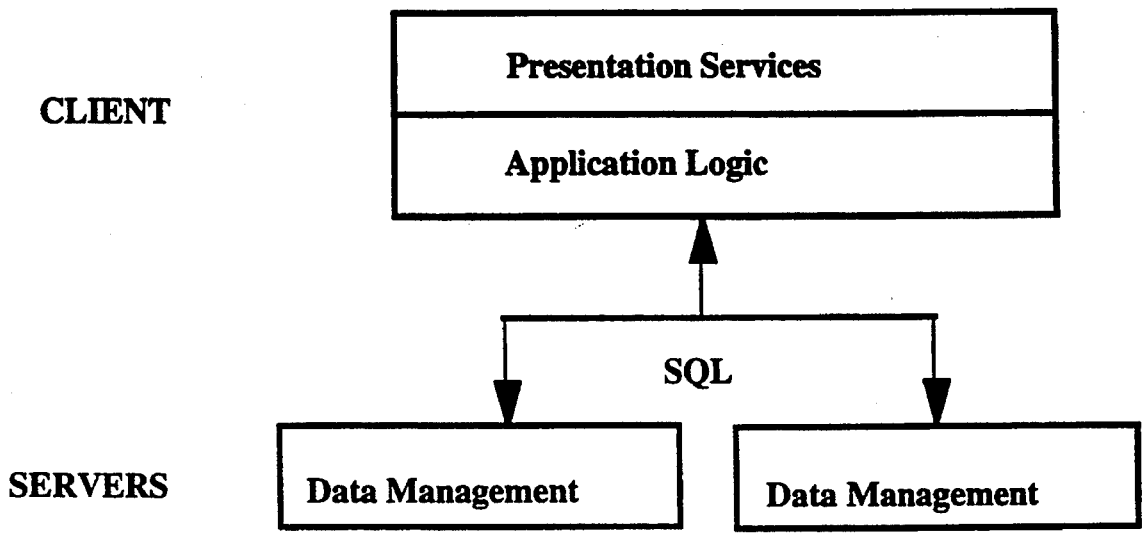
FIG. 4 illustrates a distributed data management model.
Figure 5:
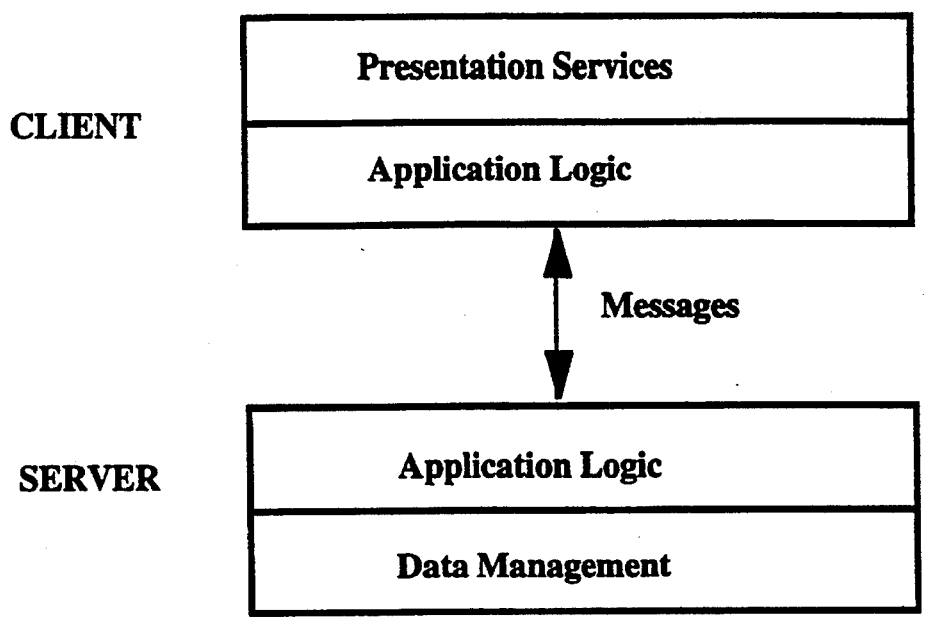
FIG. 5 illustrates a distributed function model.

Some general definitions and a description of the overall system will assist in understanding the present invention.

Distributed Applications

A distributed application provides access to distributed machines and services through a single, integrated system. The traditional client-server application runs on only two machines, a desktop computer and a database server. However, an application program using the new method can run on any number of different machines, which may be only two machines or may be many machines.

A single application program can access any number of distributed services, including

- any number of databases (on any number of distinct machines)
- 3GL services, such as an API to the New York stock exchange, a commercial statistical analysis package, or a 3GL application developed in-house
- New services, such as an image server or coordination facility A new application program can also provide fault tolerance and parallel processing by automatically accessing backup and load sharing machines.

Partitions

In order to distribute an application, Forte (the new method) divides it into two or more logical sections, called partitions. Each partition is an independent component, which can run on its own machine. For example, a typical end user application has a client partition, generally placed on the desktop, that provides a graphical user interface. Other partitions could include: a DBMS server that runs on a mainframe; an image server that runs on a specialized machine; a 3GL service; or other special services. In a preferred implementation, the method of the invention automatically coordinates all communication between the partitions.

A partition is made up of one or more service objects. To create a distributed application requires defining any needed service object as part of the project.

Service Objects

A Forte application program is made up of objects. Each distributed service with which the application program interacts is an object. For example, a database accessed from the application program is an object. Likewise, an existing 3GL application is an object. To interact with an object, the user or another object invokes a method on it, which essentially is just like interacting with any other object in the application program.

In a distributed application, every object has a single, fixed location. When a method is invoked on an object, it is executed on the machine on which the object is located. Normally, the object is located on the machine on which it was created. Each service object can be represented on other partitions by an object request broker, described below.

Although the application may consist of thousands of objects, only a few of these need to be at a particular location. These include:

an object that represents an existing external resource, such as a database management system or a 3GL service, that is already present on a particular machine an object that provides a Forte service that is going to be shared by multiple users, such as an image server {or an auction manager for an auctioning function} an object that represents a service that will be replicated to provide failover or load balancing When an application is divided into partitions, these central services are objects that may need to be placed on specific machines.

The application programmer has the option of specifying that a selected object must be located on a specific partition by creating and naming a service object. The application programmer does not need to worry about the locations of other objects in the application program. If a service object creates other objects, these will be located on the same partition as their creator. For convenience, the rest of this application will assume that a "service object" includes related objects created by the actual service object.

A service object is simply a named object that can be referenced from any method in the application program. It is like a global variable, except that the value can be specified at compile time. When creating a service object, it is assigned a name, a class, and values for its attributes.

Once created, a service object can be used like any other object. If a user or another object invokes a method on a service object that is located on a remote machine, a request for the service object is passed through a local object request broker. A broker reproduces the interface of a corresponding service object so that when a method is invoked on the service object, all requests are captured by the local object request broker then forwarded to the actual service object for processing. Any return value and output parameters are returned through the object request broker to the original invoking object. Thus invoking a method on a service object that is located on a remote machine is completely transparent.

One special service object is a DBMS resource manager, which provides access to an existing database management system. The new resource manager provides a shell to "wrap" the existing system and intercept and translate, as necessary, all messages, requests or data sent to or from the existing system. By defining a DBMS resource manager service object, an existing database management system can be treated like any other object. The user can thus invoke methods on the new resource manager to start a database session, retrieve data, update data, and so on.

Environments

To implement a distributed application in a specific environment requires providing some information about that environment. An environment is a named description of the hardware and software at a particular site, such as a particular company office or a particular department. The same logical application description can be used, without modification, to implement a distributed application in any number of environments. In addition, a single environment can generally support more than one distributed application.

To implement a distributed application requires partitioning the application for the specific environment. This means assigning each of the application's service objects to a specific partition and specifying which partition will run on which node or machine.

Partitioning

In a preferred implementation, the present method automatically partitions each object of an application program into a partition. This includes identifying and placing each service object in a partition preferred for that service object. This also includes identifying each object created by the service object and placing that object in the same partition as the service object. An object request broker for that service object can be created for any other partition and in general should be created for any partition which contains an object which can invoke the service object.

Figure 6A:
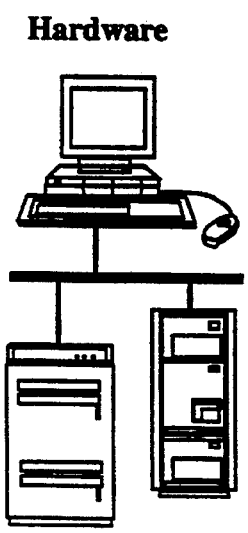
FIGS. 6A and 6B illustrate application partitioning.
Figure 6B:
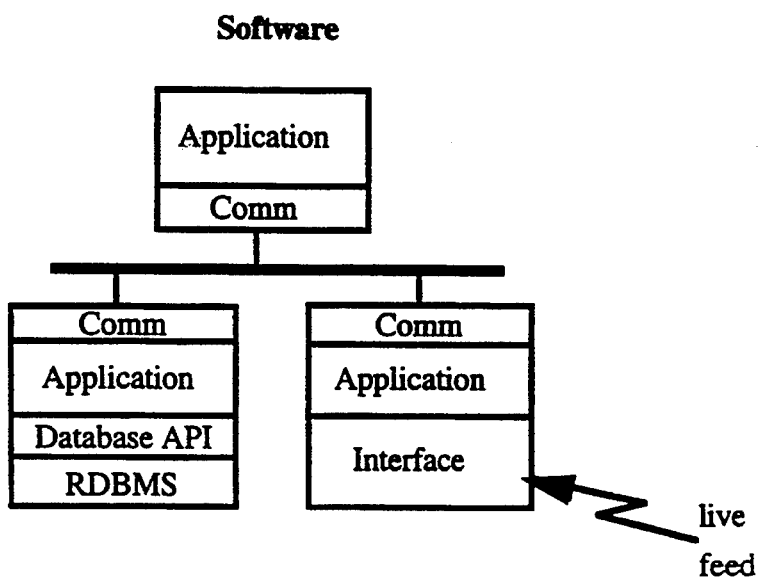

Referring to FIGS. 6A and 6B, partitioning includes assigning each partition to a particular node or machine in the environment with appropriate resources and capabilities. The partitioning can be examined and modified, for example by reassigning a certain partition to another node or by moving a service object to another partition.

Viewed another way, application partitioning is the ability to split an application program to run on two or more computers. Whereas the monolithic client application model splits the application from the RDBMS server, application partitioning provides a way to distribute the application program itself across multiple computers. Part of the application may run on the client, another part may run on the hardware that also drives the RDBMS server, and part may run on one or more other servers.

A preferred partition may be predefined, for example when a service object will wrap an existing application which is already resident on a specific machine. Not all preferred partitions need to be predefined since many service objects can run equally well on a variety of machines. The allocation of specific partitions can be made based on the hardware and software requirements of a particular service object and any corresponding created objects balanced against other service objects and available machine resources.

Once a partition has been assigned to a node and fully specified, including all service objects, objects, and object request brokers for that partition, the partition can be compiled for a particular machine. This may involve simply generating an appropriate intermediate source code, such as C++, for compilation into machine language on the specific node. The compiled machine code can be loaded on each node and the application program is ready to run.

A partition can be modified at any time by a number of means. A particular service object might be moved from one partition to another. In the simplest system with only two nodes, the initial partitioning implements at least one service object on each node. The present method allows duplicating the service object in the second partition then replacing the original service object, effectively swapping the location of the actual service object. This should make no difference to any other object in either partition except that calls from the second machine which previously were brokered are now handled directly and calls from the first machine which previously were handled directly are now brokered. If there are more than two nodes, the same general principles allow moving a service object to a different partition.

Application partitioning does not dictate a predefined split of functionality for a client-server environment. It allows the various portions of the application to be allocated in several possible ways. It recognizes that the appropriate division of application functionality among clients and servers is highly application dependent. And even for a given application, the optimal division may change over time with the addition of new users and application extensions.

With partitioning, an application program can be built as a collection of service objects and deployed as a distributed application. Partitioning allows a development programmer to place application functionality on servers as well as clients. It automates the communications among the different application partitions so that the application will function the same whether it runs entirely on the client or is distributed across several machines.

Figure 7:
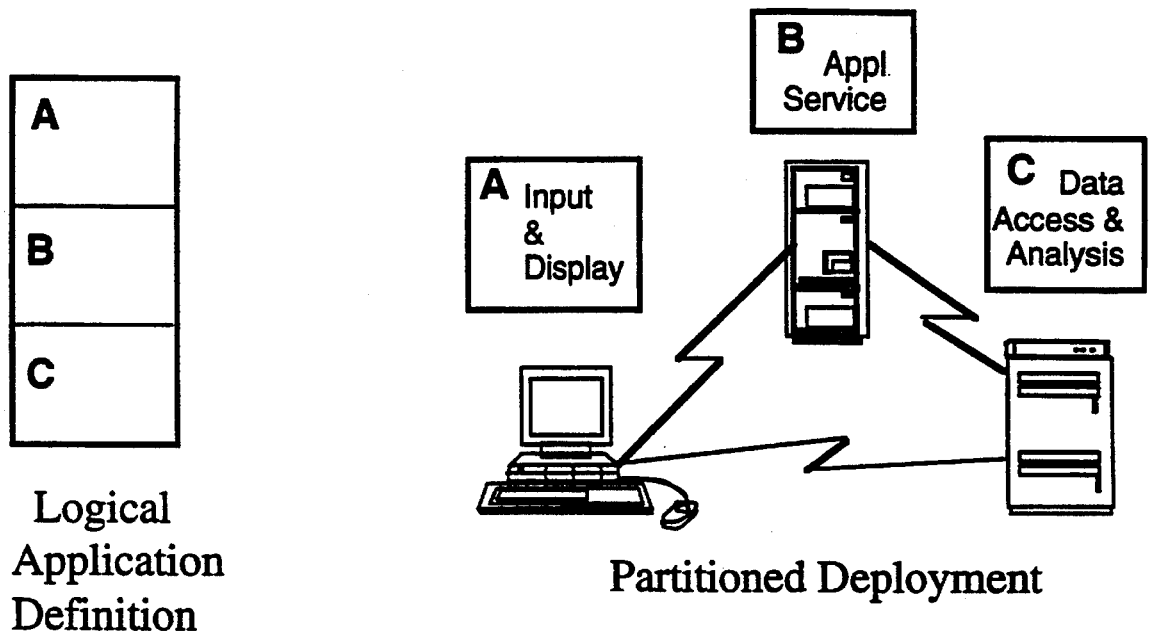
FIG. 7 illustrates another aspect of application partitioning.

Application partitioning is based on the concept of decoupling the development of an application's functionality from the decision of where the various application components will run in the deployment configuration. A developer programmer can build a logical application definition that is independent of the underlying physical environment. After development, the logical application definition is partitioned (i.e., split apart into independent modules that can execute on different nodes in a network) and communications are automatically set up, freeing the development programmer from dealing with communications during the application definition cycle. Referring to FIG. 7, a logical application definition is built as a collection of service objects that runs in a single address space even though it is subsequently distributed over two or more processors. After partitioning, the application still presents a unified system view, allowing an application administrator to manage all the component partitions from a single user interface.

Partitioned applications provide the basis for an application architecture that expands the realm of application functionality and introduces several options for improved performance, reliability and control. Application partitioning can help organizations effectively use the client-server model to build new enterprise-wide online applications that contain more functionality, accommodate more users, and are subject to rapidly evolving business requirements.

Principles of Application Partitioning

To be effective, partitioning should follow the following principles:

1. A partitioning scheme can be altered without modifying the logical application definition. The definition of the application functionality should be independent of the partitioning scheme. The application definition should be environment neutral. It should be possible to split the application in a number of different places without altering its functionality. It should be possible to increase the number of partitions for a given application if, for example, a new server is added to an existing environment.

2. The partitioning model must be able to accommodate an arbitrary number of partitions running on multiple machines. The partitioning scheme should not assume that all applications will be split to run on the same number of nodes (e.g., a client and a database server.) It should not assume that all clients are identical. It should not assume there is only one server (or any other number). It should not seek to split out a certain type of functionality (e.g., business rules) as the basis for partitioning. It should not presume the presence of a database system. Instead, it should support a very flexible partitioning model with no limitations on the number of possible partitions.

3. A single application definition can support multiple environments, each with its own partitioning scheme. Since the application definition is independent of a particular partitioning scheme, it should be possible to support different environments with the same application definition. It should be possible, for example, to deploy the same application at two sites, each with its own hardware configuration and partitioning scheme.

4. Individual partitions should be able to initiate and respond to communications with other partitions. Since a partitioning scheme can include multiple servers, a server should be able to interact directly with other servers. Servers should also be able to send a message to desktop clients which can then process those messages.

Partitioning Applications

There are several reasons to partition application functionality across multiple machines.

Performance. Simple RDBMS applications (e.g., inserting a screen of data into a database or selecting a record from a database) are not the primary candidates for improving performance with partitioning. However, applications that perform analysis, access multiple data sources, and/or orchestrate a multi-step business process may get substantial performance gains with partitioning. These gains can be realized with one or more of the following strategies.

Reduce Network Traffic. For starters, partitioning can move data analysis/reduction closer to the source of the data. This could be helpful, for example, if a user wanted to identify the stock that changed the most in value since the previous day. If the analysis to identify that stock runs on the client, then the database would need to send thousands of records across the network to the analysis module. On the other hand, if the analysis is performed on the server, only one record needs to be sent across the network.

Partitioning can also be used to execute several separate business steps with a single network round trip. For example, an order entry application may first verify a customer's credit, then compute a discount, then check the shipping schedule, and finally enter the order. With partitioning, all these functions could be placed on a server so that the entire order/entry process could be accomplished with a single communication round trip. This performance strategy may be very important if the network link to the client is slow, such as when portable computers access a server via a modem. In general, the more steps an application must execute, the greater the potential for optimizing performance by placing functionality on one or more servers.

Figure 8:
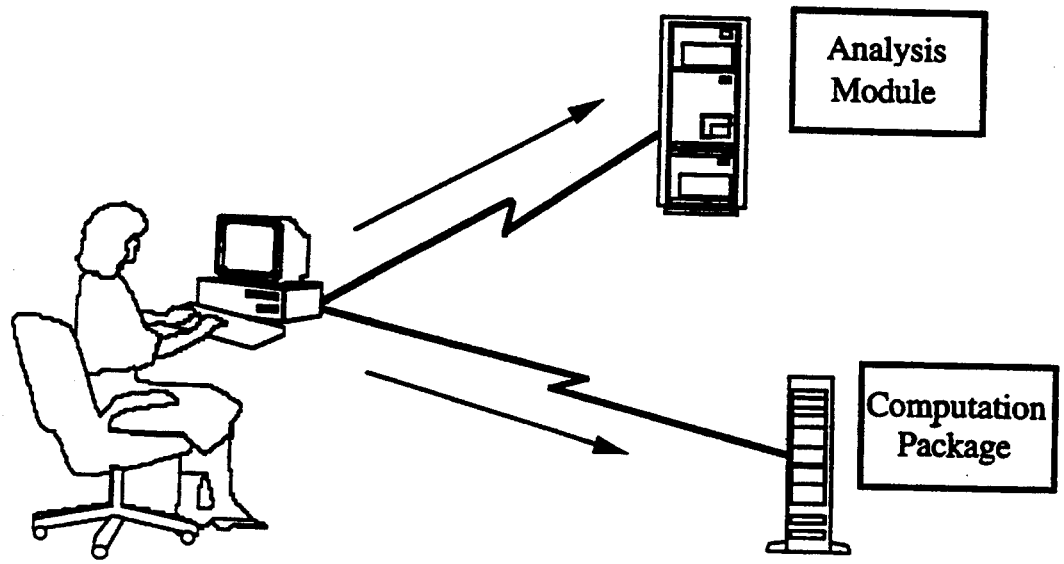
FIG. 8 illustrates processing tasks in parallel.

Process Application Tasks in Parallel. The previous order/entry example illustrates how partitioning can improve performance for a sequential multi-step application. A different strategy may be applicable when an application can execute independent tasks in parallel, such as analyzing the projected return on a proposed stock purchase against historical data and analyzing how the addition of that stock would impact the investor's individual portfolio strategy. From a business standpoint, both analyses are needed to satisfy the customer, but they can run in parallel since it does not matter which completes first. From a technical standpoint, if both analyses were run on the client, they would need to run sequentially (unless the user had a workstation with symmetrical multiprocessing). Partitioning offers the option to move one of the analysis modules to a server so that it could execute concurrently with the second analysis module running on the desktop. Alternatively, with partitioning, each analysis module could be located on its own server. See FIG. 8. This could be a significant performance win if the analytical modules were complex and/or the processing power of the server is substantially greater than the desktop machine. By running multiple tasks in parallel, an entire application can complete with a shorter elapsed time.

Offload Processing from an Overloaded Client. Some applications grow to the point where they simply overload the target client machine, even after traditional performance remedies such as recoding as much of the application as possible in a 3GL, using stored procedures to do as much work as possible within the RDBMS, and upgrading the hardware configuration of the client. Partitioning can help by moving portions of the application off the client and onto a server. Even if this strategy results in additional network communication, distributing the application often offers a net performance gain.

Control. Whereas desktop machines offer cost effective processing power, they are the most difficult environments to control. By locating critical portions of application functionality on servers, rather than placing the entire application on all clients, organizations can utilize the processing power of the desktop while preserving important points of control.

Protection Against Tampering. Corporations have long regarded their operating data as a major corporate asset, and they protect that data with many safeguards. Increasingly, organizations are also viewing their application logic as a corporate asset that deserves equal protection. A company may have developed a sophisticated modeling program, an industry leading approach for automating several business steps, or an application for approving pay increases. If the key components of these applications are placed on desktop machines, they run the risk of unauthorized access, individual tampering or corporate espionage.

Server-Based Control Points. It may also make sense to administer control points (e.g., approving expense account reimbursements) on a server because safeguards are easier to administer in a centralized environment. Partitioning allows server-based control points to be developed as part of an overall application and subsequently placed on a server. As applications continue to evolve, it is easier to change functionality in a server partition than to install a new application version on each desktop.

Flexibility. One of the strengths of a client-server environment is the ability to incrementally add both clients and servers. But these evolutionary changes can present problems for applications. Additional clients can alter usage patterns as well as increase overall processing load. If more servers are added to the network, how can applications take advantage of the additional processing power? Partitioning can offer a solution to these potential problems as well.

Figure 9:
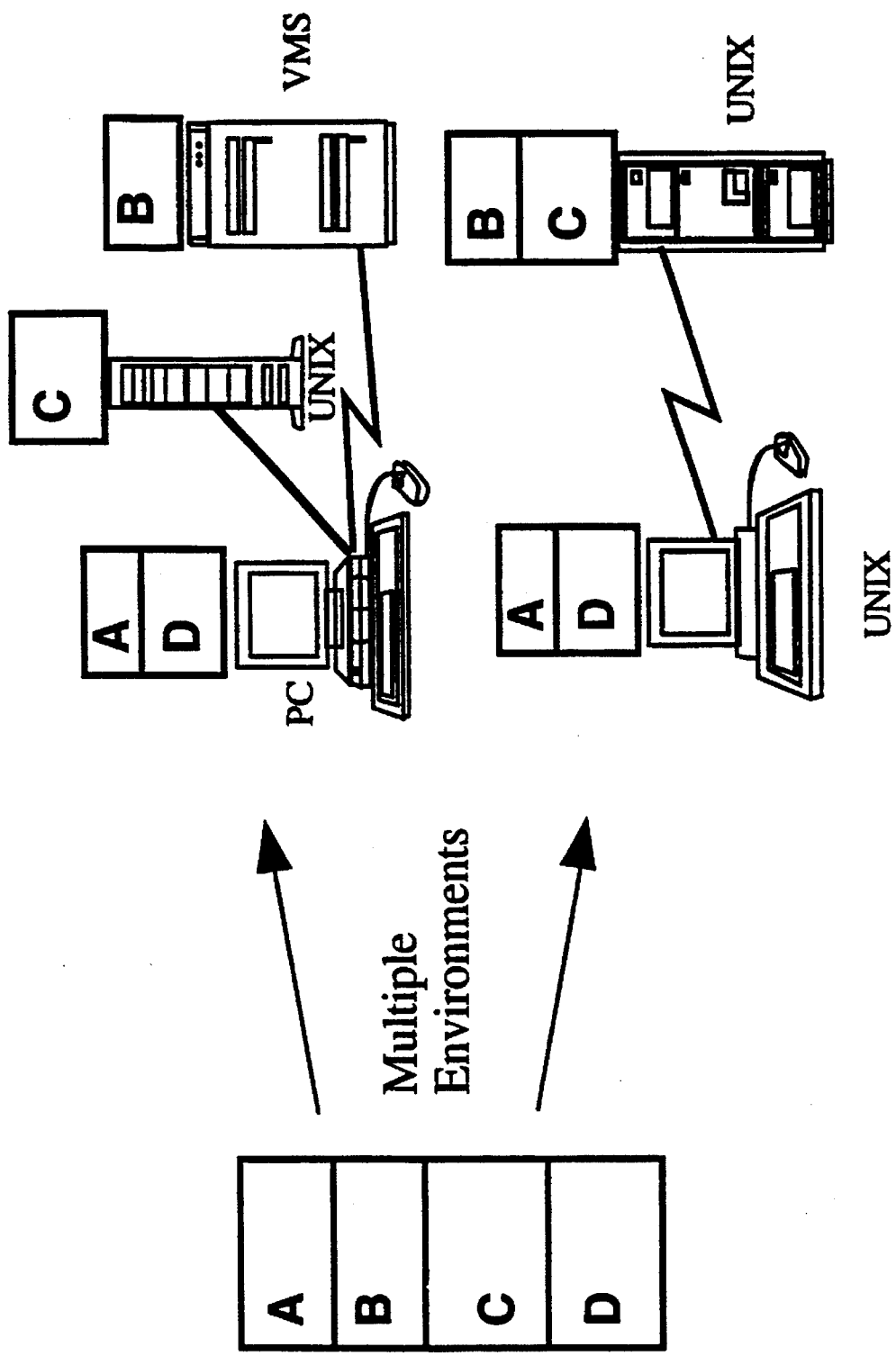
FIG. 9 illustrates implementing a single logical application definition in multiple configurations.

Support for Multiple Environments. Referring to FIG. 9, an organization's computing environment may evolve from a two-tier to a three-tier environment. Or, organizations may be required to support the same application at two sites, each with a different environment. In these instances, a development programmer may find himself redeveloping an application for the different environments. With application partitioning, the programmer can build and maintain a single logical application definition that supports individual partitioning schemes for each target environment.

Figure 10:
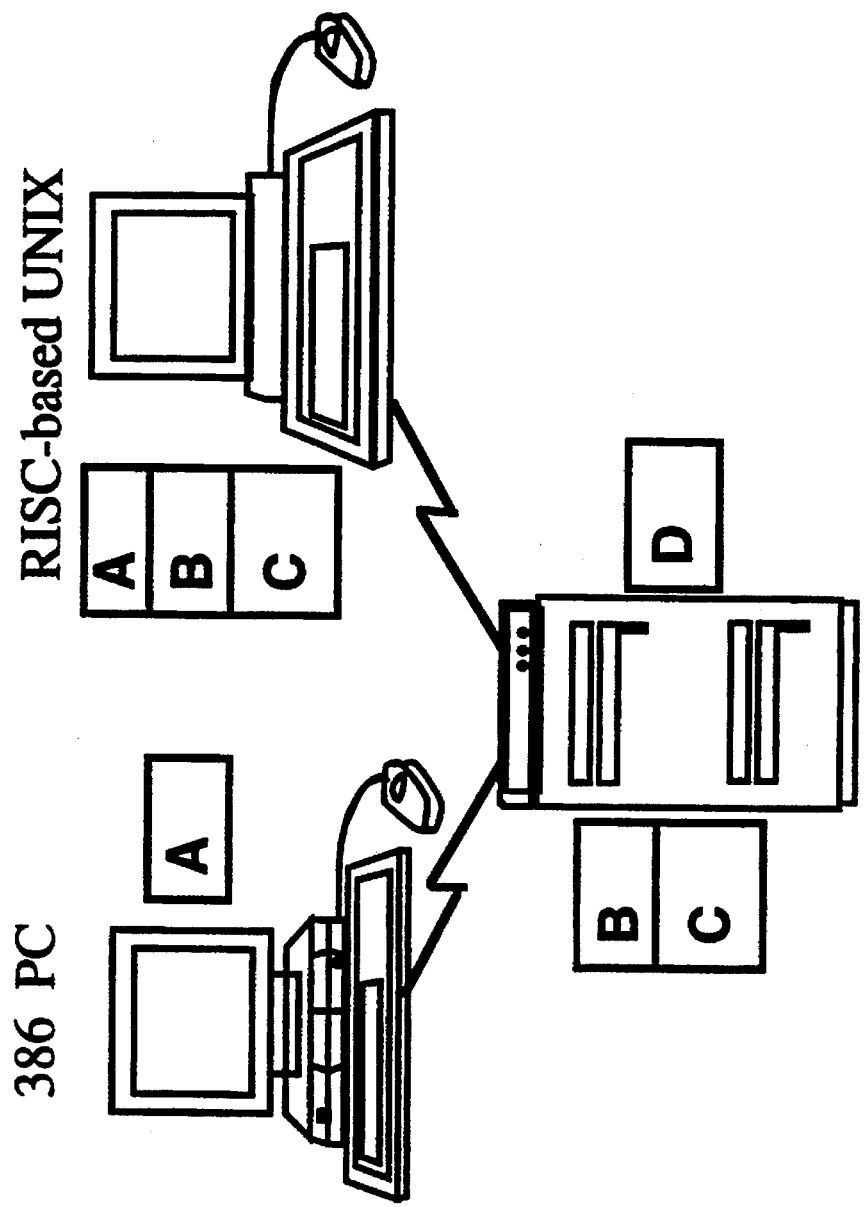
FIG. 10 illustrates implementing a single logical application definition in a mixed configuration.
Figure 10:
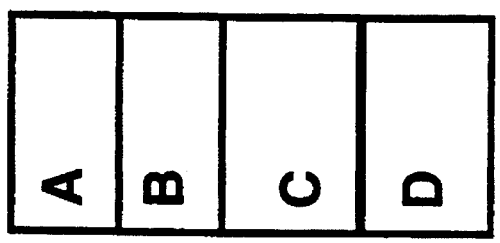

Support for Mixed Environments. Another problem arises when an application site has different classes of client machines. For example, last year an organization may have purchased hundreds of 386-based PCs on a five year amortization schedule. Since then, the organization has been buying some UNIX workstations. Ideally, a new target application could utilize both classes of desktop machines, but this presents problems. How much of the application should run on the desktop? If the development programmer must accommodate the least powerful machine, they would underutilize the UNIX workstations to accommodate the PC. Referring to FIG. 10, application partitioning offers a solution to this problem. With partitioning, a smaller portion of the application can run on the PC and a larger portion on the workstation.

Examples of Partitioned Applications

To illustrate the power of partitioning, this section describes four example applications. All share a common characteristic: the application logic (i.e., the portion developed by the programming staff) is spread over several machines, each with its own application partition. These examples do not exhaust the possibilities of application partitioning. Nor do applications need to be as multifaceted as these examples to benefit from partitioning.

Customer Service

A customer service representative in an electric utility company gets a call from a customer complaining about a recent bill. The service representative first needs to call up an electronic copy of the customer's statement. It would help to have some analysis of the customer's overall usage patterns. Was this month abnormal in the context of previous months? Were all bills for the area higher, perhaps reflecting a cold spell or some other factor that affected most people in the area?

Armed with this information, the service representative can discuss the customer's situation. In the course of the conversation, the representative may suggest participation in one of the company's special programs (e.g., subsidy for home insulation or the ability to average payments over the twelve months of the year.) The system should be able to prompt the representative to ask the potentially relevant questions and then forecast the expected benefit of each program. The customer may request a meeting with the Coordinator of these special programs, and the system should be able to notify the Coordinator, perhaps via e-mail. The customer may request a technician's visit to see if there is an energy leak on the property, and the system should allow the representative to schedule such a service visit. The bill may be in error (e.g., service was not shut off when a customer moved), and the system should allow the representative to correct that oversight (after verifying its validity). And, when the call is complete, the system should generate a letter to the customer confirming the actions that have been agreed upon.

Figure 11:
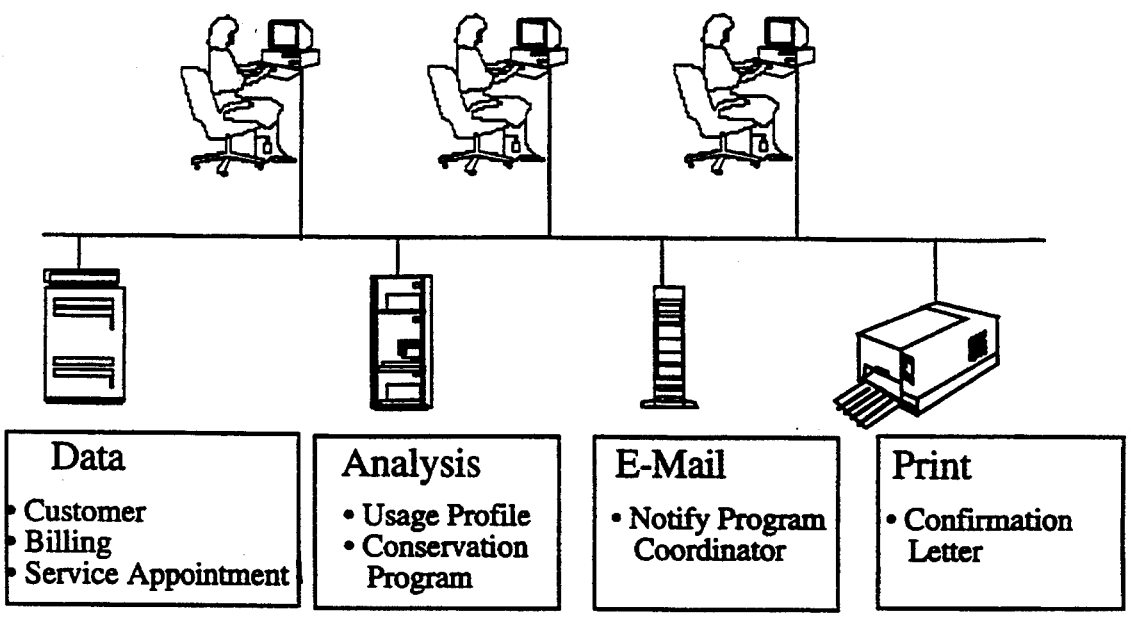
FIG. 11 illustrates a representative implementation of the method for a customer service application.

This type of application requires access to multiple data sources and application services that may distributed throughout the network. Referring to FIG. 11, customer and billing data may be kept in an RDBMS. The service appointment schedule may also be kept in the RDBMS. The usage profile analyses and conservation program analyses may run on a different server. The application needs to interface with both the e-mail system (to send notification to the program coordinator) and the printer (to generate the confirmation letter.)

This example could use as few as two partitions or as many as five in various implementations. One partition would run on the user's desktop, most probably with a graphical user interface (GUI) to simplify the navigation among the many application functions. The formatting of the customer's billing and account information could take place either on the desktop or on the data server. The analyses may be newly written for this application; or they may have been written previously, in which case the new application needs to interface with them. These analyses could conceivably run on the client or on the database server, but it may be preferable to run them on a separate server. Partitioning allows the development programmer to postpone having to decide where they will run, and it gives the development programmer the freedom to relocate them after the initial deployment.

Interfacing with the e-mail system and the printer pose their own challenges. This example covers the simple case of sending instructions to these external systems. (The next example covers the more complex case of receiving and displaying mall.) The interfaces could run on the client, but this could tie up the client machine while invoking the e-mail and print subsystem and while dealing with any error conditions that arise (e.g., sending the letter to a different printer, or queuing the e-mail message until the e-mail system is available). The alternative is to place those portions of the application on the e-mail server or a print server (or a single server where both interfaces run).

Partitioning can simplify the building of this application (and the other examples) in three ways. First, it allows development programmers to build the entire application without having to decide in advance where the various components will run. Second, it allows development programmers to use the same tool for all application components, as opposed to using one tool to build the client portion and a different tool (or multiple tools) for the server components. Third, it automates communications among the potions of the application running on the different machines.

Manufacturing

Figure 12:
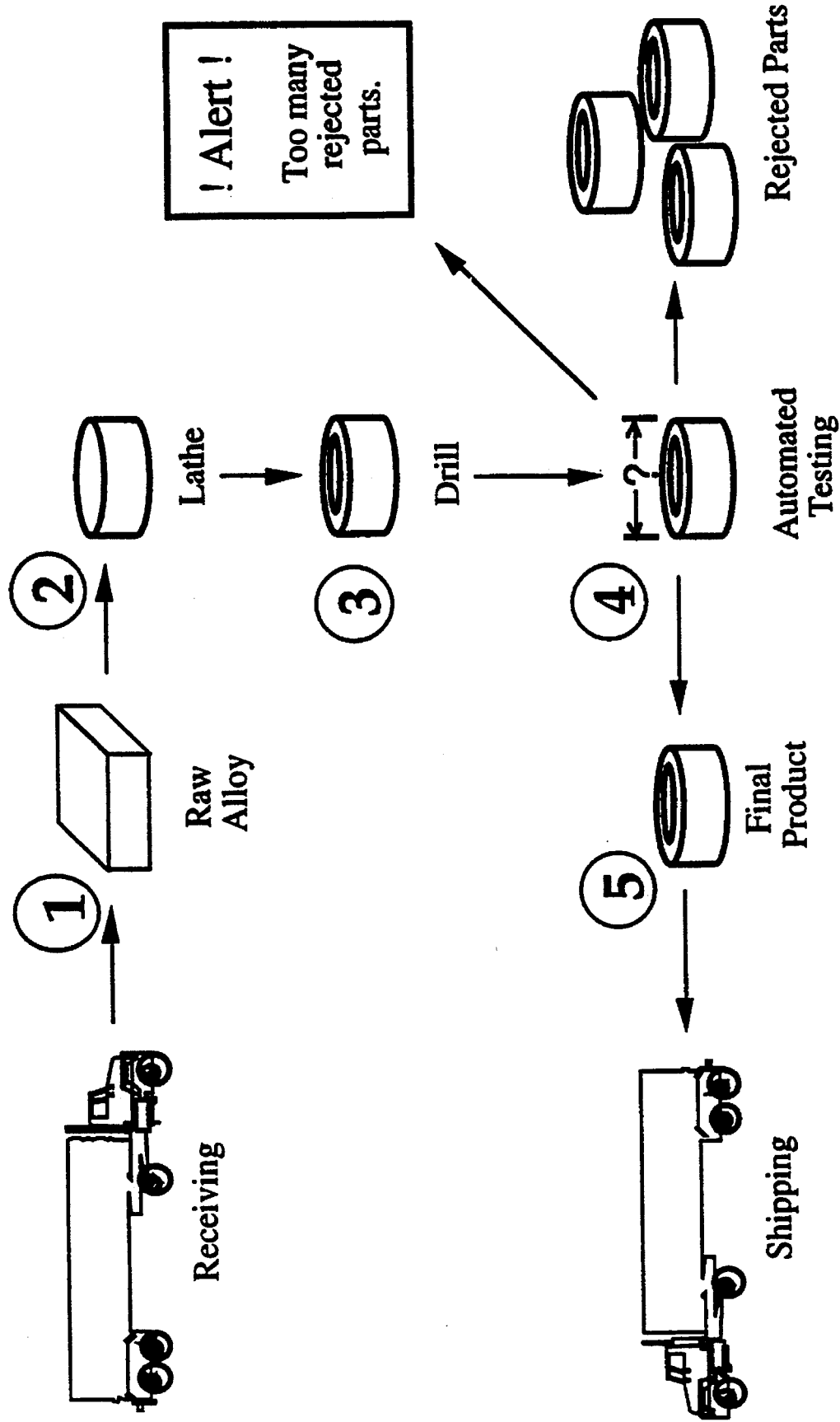
FIG. 12 illustrates a representative implementation of the method for a simple manufacturing process application.

Referring to FIG. 12, this example models a very simple manufacturing process where a company machines a part from a raw metal block. The company receives the raw blocks from a supplier, shapes them with a lathe and drills a hole according to the buyer's specification. Then the parts are taken to a testing machine to verify that they conform to the customer's specification before shipping. The testing system automatically rejects failed parts and alerts management if the failure rate exceeds a specified number per hour. The alert should be pre-emptive: it should open a new window and display a message, even if the user is running another application at that time.

Figure 13:
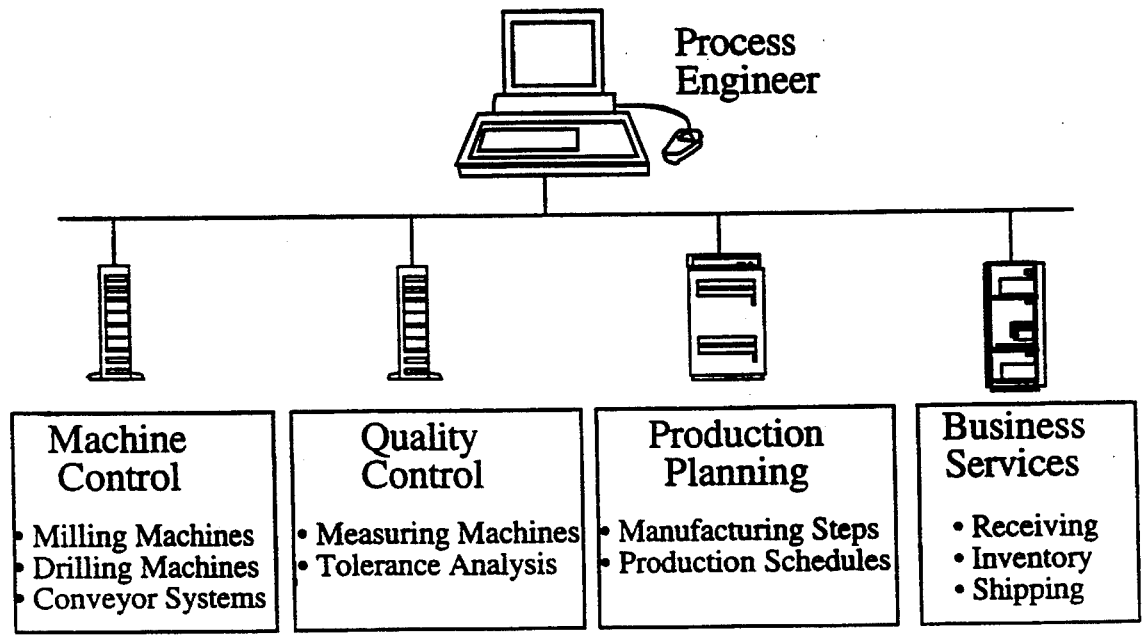
FIG. 13 illustrates a representative implementation of the method for another manufacturing application.

Referring to another example illustrated in FIG. 13, this application involves building many components: a shipping and receiving system, a user interface for a process engineer to set the lathe and drill for the required measurements, an interface to the testing machine to set the tolerance allowance and reject the failed parts, and the ability to send an alert to the process engineer if the failure rate is excessive. These components will run on different computers including general business systems and shop floor machine controllers. Referring to FIG. 13, in one preferred embodiment a machine control computer controls milling machines, drilling machines and conveyor systems on the shop floor. A quality control machine controls measuring machines and performs or supervises tolerance analysis. A production planning machine monitors manufacturing steps and production schedules. A business services machine monitors receiving, inventory and shipping. Each of these machines is connected together, along with an interface for a process engineer, to provide an integrated application composed of service objects as needed to implement each function.

The decision as to where the various portions of the application should run may be less problematical than with the customer service example above. The interface to the manufacturing and testing machines should probably run on the controllers for those machines. The user interfaces for the process engineer and the shipping/receiving clerk need to run on their desktop. Maybe there are one or two general business systems. The challenge of this application is to build all the components as a fully integrated application. The goal is to minimize the amount of code needed to transfer the manufacturing specifications from the process engineer's screen to the shop floor machinery and to accomplish the other business functions. Without partitioning, development programmers would need to build this application from the ground up as a collection of independent parts. They would probably use different tools for building the GUI portion and the interfaces to the various machine controllers. And they would need to do their own version control and software configuration management. Partitioning offers the alternative of building the entire application as a single entity and then allocating the various partitions to the nodes where they would logically run.

One of the special challenges of this application is the alert to the process engineer when the failure rate exceeds threshold. It involves either continuous polling of the testing machine or being able to send a message from the testing machine to the engineer's desktop. Sending a message is preferable from a performance standpoint. If this type of messaging capability is supported in the development environment, partitioning allows the alert to be built as though it would run on a single machine and then physically separate the initiation of the alert from the display on the user's desktop.

Financial Services

Figure 14:
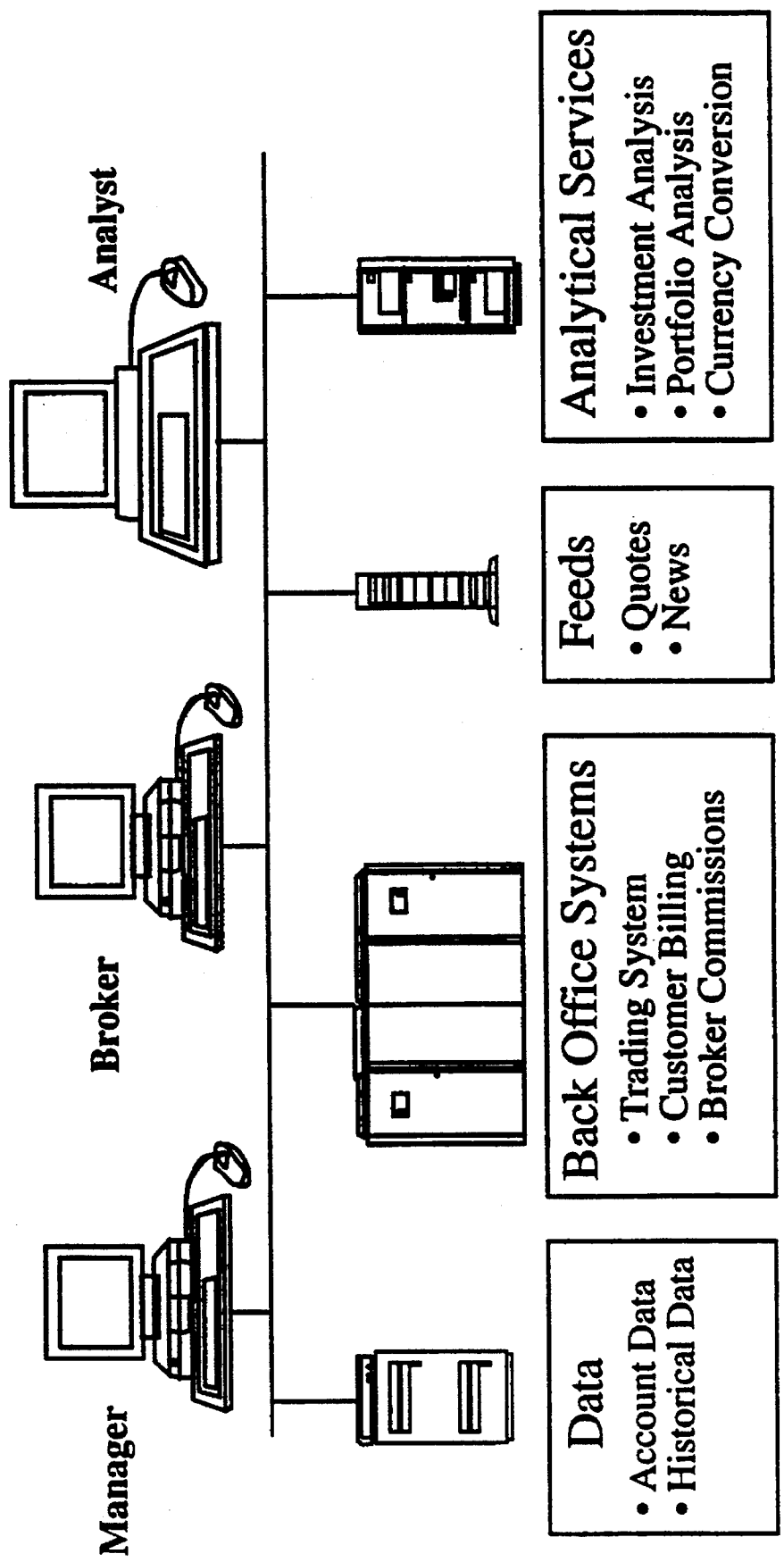
FIG. 14 illustrates a representative implementation of the method for a financial services application.

A securities broker generally needs random access to many different types of data. Referring to FIG. 14, when a customer calls, the broker may need to look up the customer's account information. When they discuss the purchase of a new security, the broker needs data from real time feeds showing the current price and any up-to-the-minute news on the company. The broker may also want to consult historical data on the security. Before recommending a purchase, the broker may want to consult a Portfolio Analysis model to see how this security would fit in with the customer's overall investment strategy. And the broker may also want to consult an Investment Analysis model that compares this potential investment with alternative investments. If the customer wants to buy the security, the broker needs to enter the trade and get immediate confirmation that the trade was successfully executed at the agreed upon price. Or, if the market has moved higher in the meantime, the broker can then ask the customer if they want to purchase the security at a higher price. After the trade has been executed, the broker needs to initiate the processes to bill the customer, update the customer's portfolio listing, and include the trade in the broker's commission plan.

In the meantime, other users are running different applications that access much of the same information for different purposes. Financial analysts may be monitoring current stock prices, following-up on recent news, and conducting in-depth analyses of historical data and daily trading volume. They may change their recommendation on a stock and need to send e-mail to brokers whose clients have a position in that particular stock. At the same time, the office manager may be monitoring the trading volume of his office and analyzing the production of the various brokers.

As with the other examples, this application lends itself very well to a client-server architecture. The different types of users may be running different desktop applications, but they all may access a set of shared services. These services can include direct access to raw data (stock price quotes and feeds, news feeds, plus account and historical data), predefined reports (customer portfolios, daily broker productivity) and other application services (analytical models such as investment analysis and portfolio analysis, currency conversion algorithms, e-mail, access to back office systems which provide trading system, customer billing and broker commission information). Client-server gives the brokerage house maximum flexibility for developing, maintaining, and integrating these services, while the use of a GUI on the desktop can simplify the end user's task of navigating among the various services. Without partitioning, the various application components would need to be built in isolation. With partitioning, all services could be built in a single development environment and subsequently allocated to the different machines in the client-server environment.

Order/Entry

Many organizations are using or investigating visually oriented, interactive order-entry systems. These systems have the potential to give customers greater control in specifying exactly what they need, to increase customer satisfaction, to reduce the number of incorrect orders, and to streamline the entire process of buying a product. This approach is under active development by several retail sales organizations. The present invention can be used to develop new ways of ordering goods, for example ordering a new car. All of the supporting the technology is in place, and partitioning would simplify the development of the application.

After looking at, and maybe driving, an available floor model or two of a certain car, a customer sits down with the salesperson at a PC to get an exact quote and close the deal. As with most order/entry systems, the application would first qualify the buyer, accessing available services to check credit ratings and possibly bank balances and employment status. The buyer would point-and-click on the model he wanted (or he could view multiple models simultaneously, zooming in to view one at a time when desired). He could experiment with different color schemes and detailing options which would be displayed on the screen in full color. The model under consideration could be rotated for viewing from any angle. Exterior options, such as mag wheels, would be displayed as they were selected. The system could provide an interior view for that model's cockpit from the driver's viewpoint. The system would prompt the customer for non-displayable options (engine size, passenger side air bag, extended warrantee), all while maintaining a running total price that could be displayed whenever appropriate. When the specification is complete, the system could check the availability schedule and give the buyer a target delivery date. Then the order could be submitted electronically and managed electronically throughout the manufacturing process and the shipping cycle.

Figure 15:
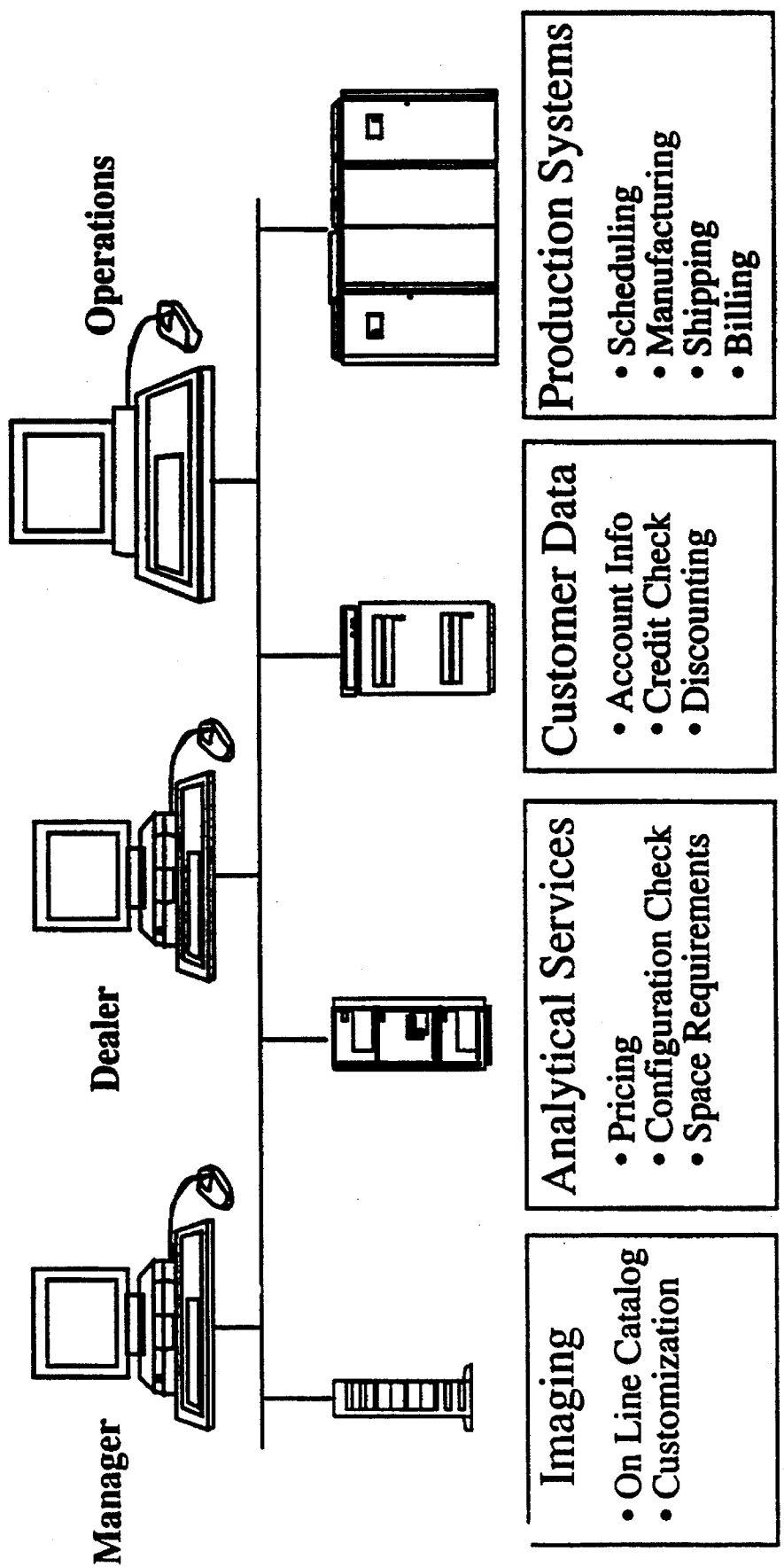
FIG. 15 illustrates a representative implementation of the method for a customized product order/entry application.

The same method can be used for other purchases such as the design and order of an office furniture system or custom window assemblies for the home. Referring to FIG. 15, all have similar requirements for component services: imaging systems (such as on line catalog or customization information), analytical systems or services (such as pricing, configuration checking or space requirement information), data systems (such as customer data, including account information, credit check information or product discounting information), and an interface to production systems (such as scheduling, manufacturing, shipping, and billing).

Like the other examples, this type of application is well suited for client-server where application components will be running on multiple machines. The application may need to talk to databases, imaging systems, and credit checking services, while providing analytical services (pricing, configuration checking, total weight, delivery date) and business services (order/entry, manufacturing, shipping, billing). The more facets to an application, the more partitioning can help to reduce development complexity.

Building Partitioned Applications with Forté

Figure 16:
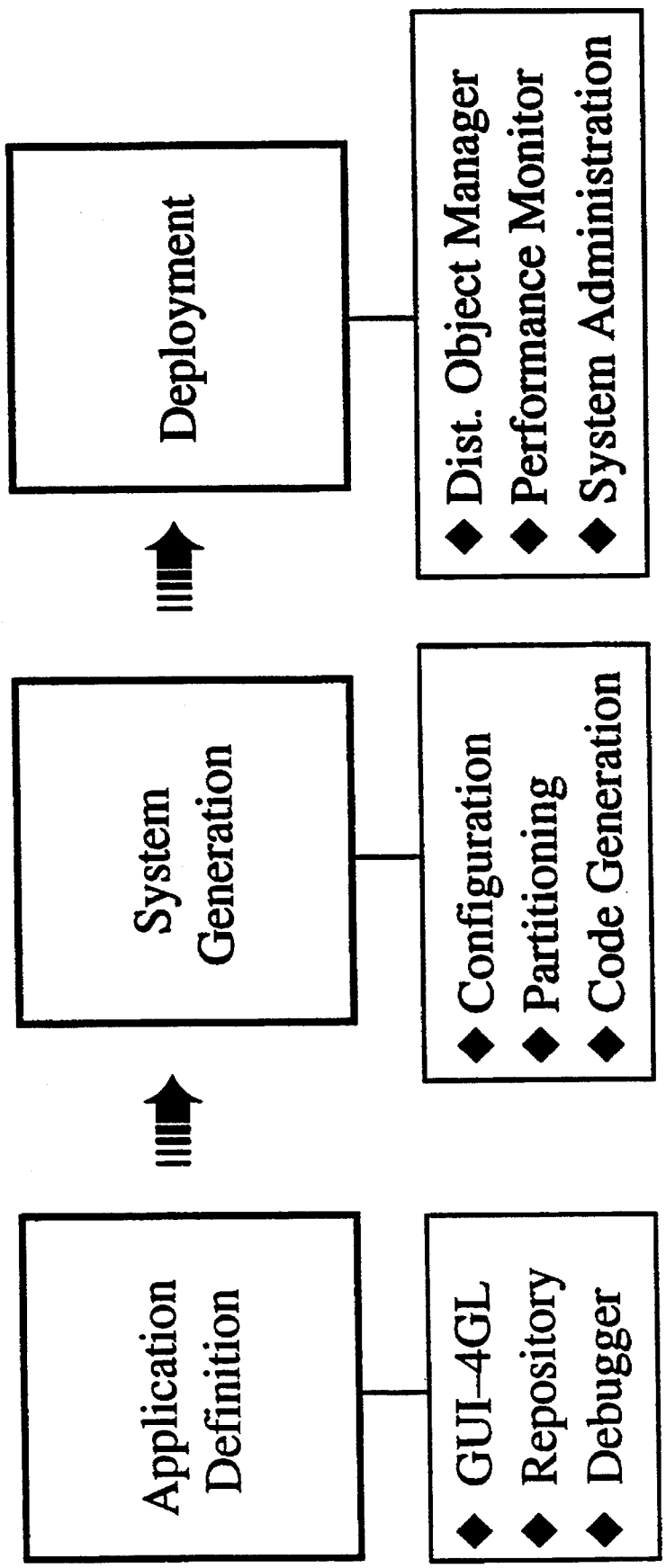
FIG. 16 illustrates a program development cycle using the new method.

Forté is an advanced application development environment for building and deploying partitioned applications. It includes a repository-based development environment complete with a GUI forms painter, an object-oriented 4GL, and an interactive debugger. Programmers use this development environment to create a logical application definition that specifies the desired functionality independent of any specific physical environment. Forté also includes tools for specifying a target deployment environment and generating a default partitioning scheme for the targeted environment. In addition, Forté includes tools for managing the partitioned application once it has been deployed. Referring to FIG. 16, these tools support a three-phased development cycle: application definition; system generation; and distributed distribution. Application definition may utilize GUI-4GL information and a repository of information about service objects. A debugger is helpful for this phase of program development. System generation includes configuration and partitioning as well as code generation. Deployment uses a distributed object manager and performance monitor for system administration to effectively distribute and utilize service objects.

Building a Logical Application Definition

The first step is defining the logical application definition. This step corresponds to creating a client-resident application with other 4GL tools. But with Forté, the logical application definition can be partitioned subsequent to the development phase.

The Physical Development Environment. The logical application definition is independent of any particular physical deployment environment, thus giving development programmers considerable flexibility for their physical development environment. The inventive method provides transparent portability across many environments, including the following:

Desktop/GUI-Windows, Macintosh, Motif, Presentation Manager

Server-UNIX (IBM, Sequent, HP, & Spare) and VMS (VAX & Alpha)

Network-TCP/IP, DECnet, Novell, AppleTalk

RDBMS-Oracle, Sybase, Rdb, Ingres, Informix

TP Monitors-ACMS, Encina, Tuxedo

Development programmers can use any supported environment to create the logical application definition. The application can be subsequently deployed in an environment with different hardware and software configurations. For example, development programmers may use PC clients talking to a Spare server for development, and then deploy on Mac clients talking to VMS server. Portability and partitioning are both required for environment independence. As client-server environments continue to evolve, the addition of new machines and usage patterns may require both a repartitioning of the application and a rehosting of application components onto different machine environments.

An Application as a Collection of Service Objects. As described above, a Forté application program is designed as a collection of service objects. Service objects may include, but are not limited to: display services, database access, interfaces to external services (legacy systems, electronic feeds, e-mail), and organization-specific business services. The service object approach allows an organization to model its own business from the user's perspective.

For example, to process a new order, the organization may need to verify the customer's address and credit rating, check with inventory to make sure the desired product is available, send notice to accounting to initiate the billing cycle, and instruct shipping to mail the product. Prior to computers, people dealt with other people or with paper forms that other people handled. The process was laborious but relatively easy to comprehend. With the advent of computers, the time to process an order can be accelerated, but it requires a data infrastructure. Customer records are stored in a database, along with accounting, inventory and shipping data. The job of the application programmer is to provide a mapping between the user interface (perhaps a form on a computer screen) and the data infrastructure.

With procedural programming, this mapping is usually application specific and can be complex. An order/entry application, for example, may call up the customer record from the customer database, check the customer credit database, request the quantity on hand from the inventory database, check to see that the quantity on hand can support the order, update the order database, and add a new entry into the shipping database.

Figure 17B:
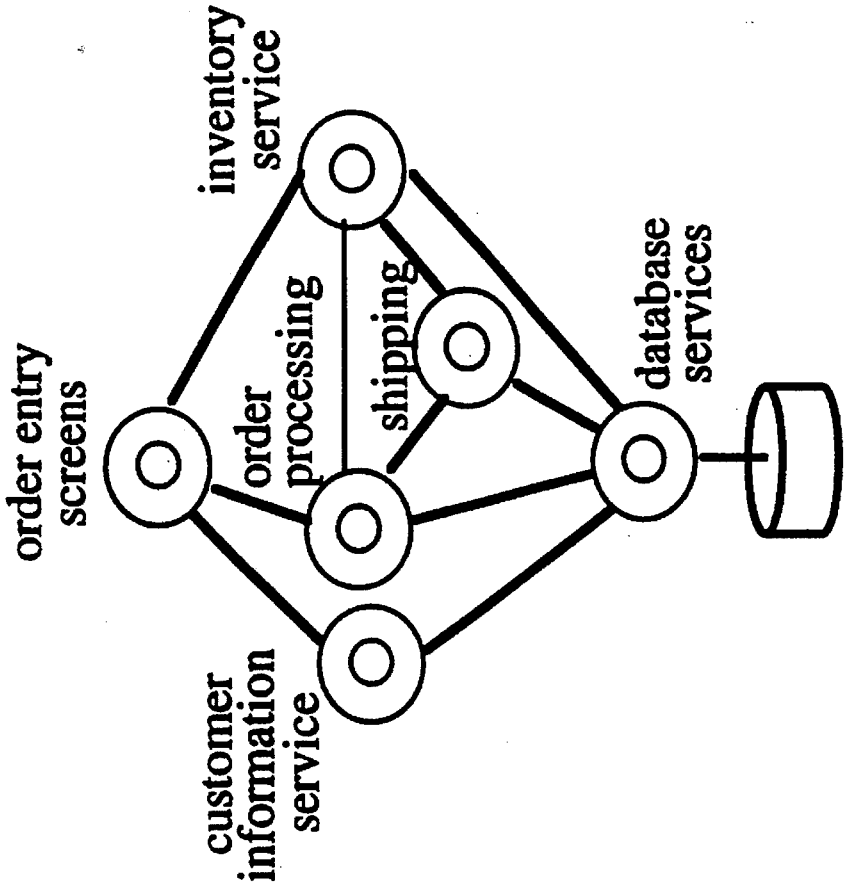
FIGS. 17A and 17B illustrate a sample application program as a traditional procedure and as a collection of services.
Figure 17A:
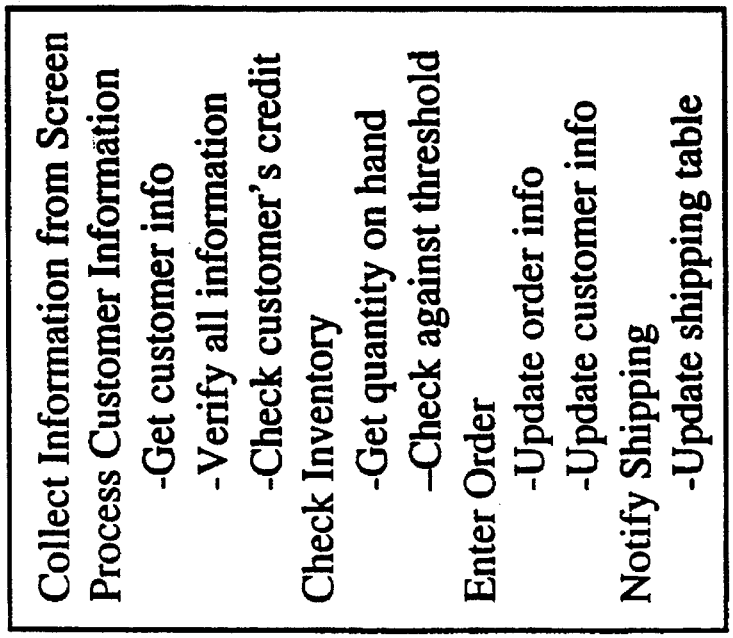

With a service object approach, the job of the programmer can be simplified. Referring to FIGS. 17A and 17B, the RDBMS data infrastructure remains in place. But now development programmers simply create a new service object that encapsulates the data infrastructure. For example, development programmers may create an inventory service object, an order processing service object, a customer information service object, and a shipping service object. These can be controlled or guided through a connected order entry screen service object and a database service object.

This type of service object infrastructure can simplify the development programmer's job in several ways. First, it simplifies the development of new applications by allowing development programmers to reuse existing service objects. A new inventory application can be written that uses the inventory service object developed originally for the order/entry application. Second, it simplifies application maintenance by providing an additional layer of abstraction where business rules can be enforced while insulating application programs from change. If the company wants to decrease the amount of inventory it keeps on hand, it can modify the inventory service object instead of modifying many individual programs. (By using code generation technologies, Forté minimizes the performance impact of another abstraction layer.) Third, service objects represent a modularized view of an application that can both mirror the company's organizational structure and provide a basis for partitioning.

The Forté approach to partitioning is not based on splitting out business rules or some other predefined category of application functionality. Forté does not require development programmers to fit their applications into one or several predefined molds. Instead, Forté allows development programmers to model their application environment in the way that makes most sense to them. No structured methodology is required to build Forté applications.

Forté uses the development programmer-defined service objects as the basis for partitioning. Each partition includes one or more service objects. All service objects will be kept intact within a partition. No service objects will be divided among partitions. An application may have three service objects or it may have thirty. The greater the number of service objects, the greater the number of possible permutations for partitioning purposes.

Forté Objects. Forté is designed to deliver the benefits of object-oriented programming without requiting a total commitment to object technologies. Users do not need to store their data in an object database. Nor do they need to use C++, Smalltalk or other object-oriented languages. Instead, Forté provides development programmers with a forms-based environment for creating classes and a procedurally oriented 4GL for writing their methods.

Under the covers, Forté is object oriented. (It is written in C++ and supports object orientation with encapsulation, inheritance and polymorphism.) Forté objects are reusable across applications, and development programmers can add or change methods without recreating the object. Fort6 objects pass messages among themselves. (Forté provides its own peer-to-peer messaging system for communicating among Forté partitions. It can also use either an RPC (Remote Procedure Call or a CORBA (Common Object Request Broker Architecture) style messaging transport for communicating with external objects and services.

Forté supports the creation and manipulation of both GUI-based objects and general application objects. Most GUI tools support GUI-based objects that are represented as icons on a screen. Not all of these tools, however, support the creation of application objects, such as an inventory service, that are application logic services and not just presentation services. Forté supports these application services which are crucial to application partitioning. When an application is partitioned, these application services can be located on a server where they may be accessed by many users of the same application and/or by different applications. Fonté is a development environment for building both client applications and server applications. This is a major departure from traditional application development tools.

In order to support the development of application objects that can function as servers, Forté extended its object model in a few key areas. Most tools for building client applications have no notion of shareability because the application code is designed to run on a single user client machine. These applications rely on a server, such as an RDBMS, to handle such multi-user issues as concurrency control and transactions. Forté built concurrency control and transactions into its object model so that server applications can provide the same style of shareability as an RDBMS, even where a portion of the application does not use an RDBMS.

The Software Development Environment. Forté provides a set of visually oriented workshops for building an application. There is a Windows Workshop for designing screens with a point-and-click style interface that creates screen widgets from a palette of standard widget types. There is a Object Workshop that provides a form for creating application classes and other application components. There is a Method Workshop for writing methods in the Forté high level language. Since the Forté language supports reusable application objects, it can be accurately described as an object-oriented 4GL.

The Forté language incorporates constructs from three types of languages. It incorporates event loop programming, first popularized by Hypercard and subsequently utilized by most GUI tools to deal with the unpredictable arrival of non-sequential user actions such as choosing a menu item from a list of several possible choices. Forté uses event loop programming to handle events that originate on the user's screen and also to handle events that are initiated by the system and by non-screen based application components (such as sending an alert from a testing machine on the manufacturing floor to the process control engineer's workstation.) The Forté language also includes procedural programming constructs found in most third and fourth generation languages for handling the flow of control (if. . . . then . . . else) and for creating variables and expressions (1+1). In addition, Forté incorporates standard SQL for accessing an RDBMS. By incorporating standard SQL into the development language, Forté can provide RDBMS portability by mapping SQL calls into numerous SQL dialects and by generating vendor-specific stored procedures for optimizing RDBMS performance. Forté also provides an interactive 4GL debugger (that was built using the Forté 4GL.)

Figures 18, 19:
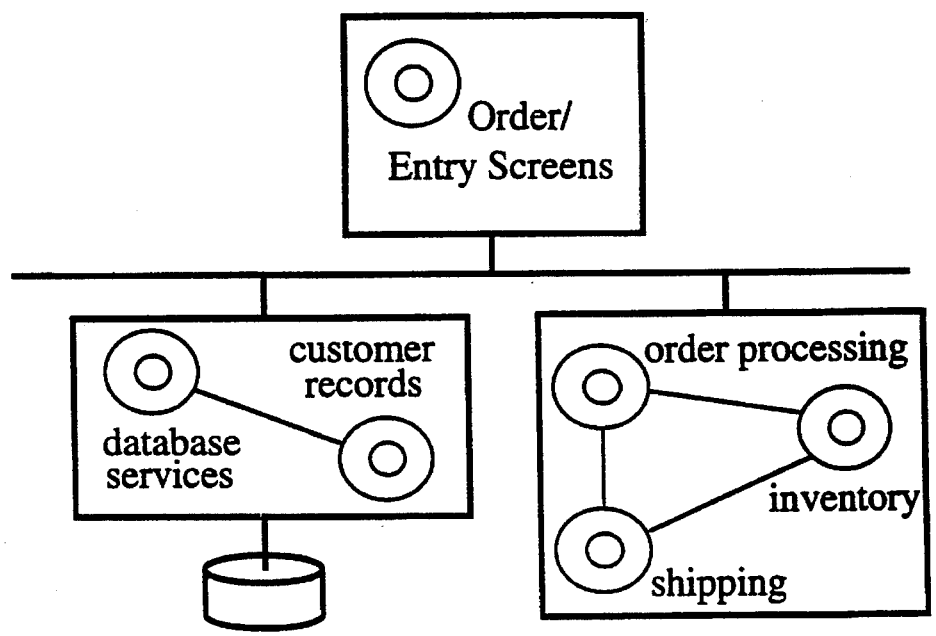
FIG. 18 illustrates the new development environment architecture.
FIG. 19 illustrates distribution of service objects through partitioning.

Referring to FIG. 18, all development work is stored in the Forté repository. (The Forté development environment includes a browser to view the previously created classes, their methods, and attributes so they can be reused or easily modified for new applications.) The repository stores the definition of all application service objects in an environment neutral form.

The repository provides several functions. It supports team development with check out/check in so that several development programmers can be working on different parts of the application at the same time. It supports versioning and configuration management to facilitate builds of complete applications. It stores the definition of that target deployment environment. And it stores each partitioning scheme for each environment.

Generating a Partitioned Application

Once an application has been defined, the development programmer can test any partitioning scheme by simulating the deployment environment in the development environment. At this time the application can be repartitioned without modifying the application definition. The application can be repartitioned at other times as well.

The first step in the system generation phase is to define the target deployment environment. What are the clients (Windows, Mac and/or Motif), what are the servers, networks, databases? This information is stored in the repository for use in the partitioning process.

The second step is the default partitioning of the application. When the partitioning command is given, Forté retrieves the specification of the target deployment environment and analyzes the logic of the application definition. It examines each service object and notes whether it was designed to be shared or to be accessed exclusively by a single user. If it was designed for exclusive use (such as the set of presentation services), Forté will place that object in a client partition. If it was designed for shared use, it is a candidate for being moved to a server. Some service objects are associated with an external resource. For example, an interface to access an RDBMS is associated with the target RDBMS and its physical location. An interface to a legacy system is associated with that system and its physical location. Other access services may include real time feeds such as a stock ticker or process monitoring feed. In each case of access to an external service, Forté will make a default assignment of the partition to run on the node where the interface is located, as defined in the repository. There may be a number of other shared service objects that are not directly associated with an external resource. These may include computational or analytical services, and they may include a set of business rules that enforce an organization's policies. These shared business services may access other service objects that, in turn, provide raw data from a database or real time feed. These shared services may also access other services for coordination purposes. In the order/entry example above, the order process service object accessed both the inventory service and the shipping service as well as accessing the database directly. Referring to FIG. 19, where there is a set of service objects that do not directly access an external resource, Forté will attempt to allocate those service objects evenly across all the available hardware servers as defined in the target configuration.

This default partitioning approach may not produce the ideal partitioning scheme, but it is a starting point. Forté also provides tools for performance monitoring and repartitioning to allow for a manual overriding of the default partitioning scheme.

The use of an object model for development helps to identify the logical boundaries for partitioning. Since each service object instantiates a potentially large number of objects at runtime, each with its own methods, the default partitioning process must identify all the possible methods that can be invoked in each partition. The system must then locate those methods in that partition so they can be accessed when called. Partitioning will not work efficiently if these methods need to be fetched at runtime from another node.

Figure 20:
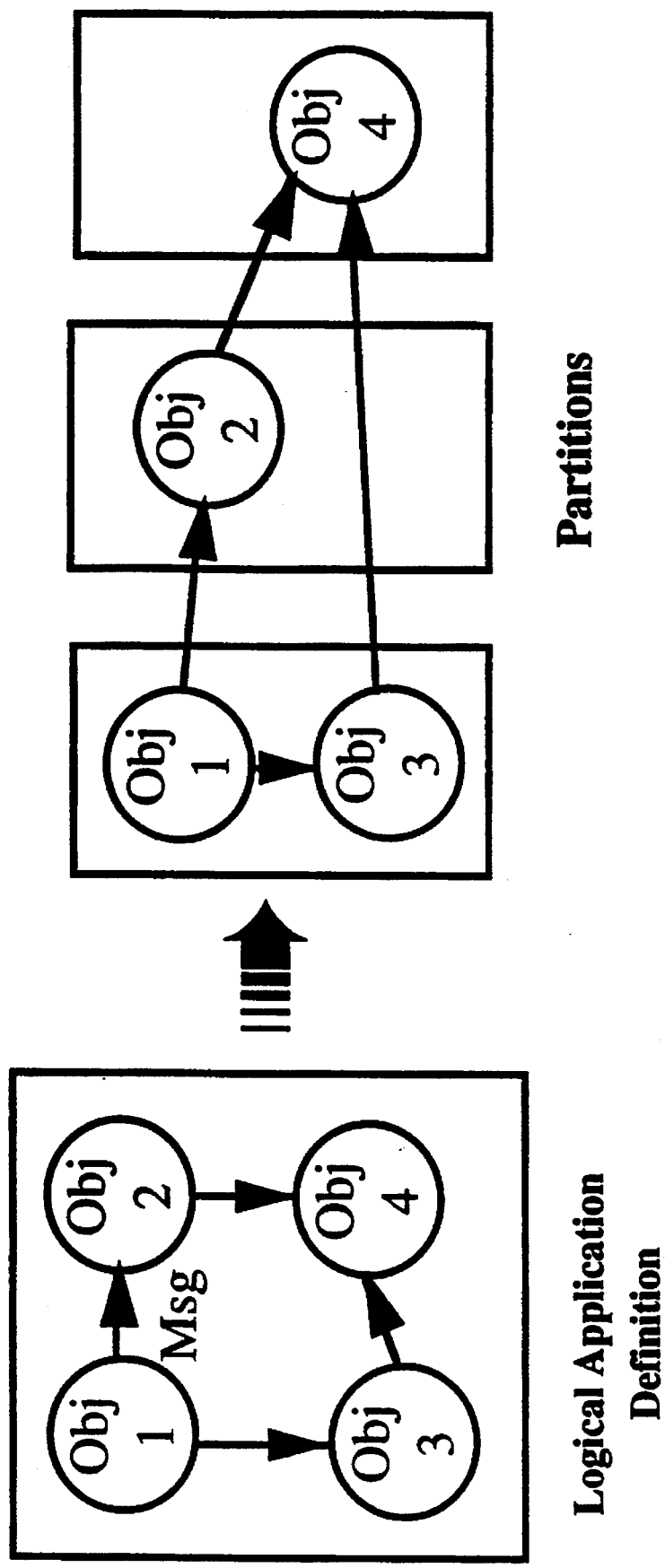
FIG. 20 illustrates default partitioning.
Figure 21:
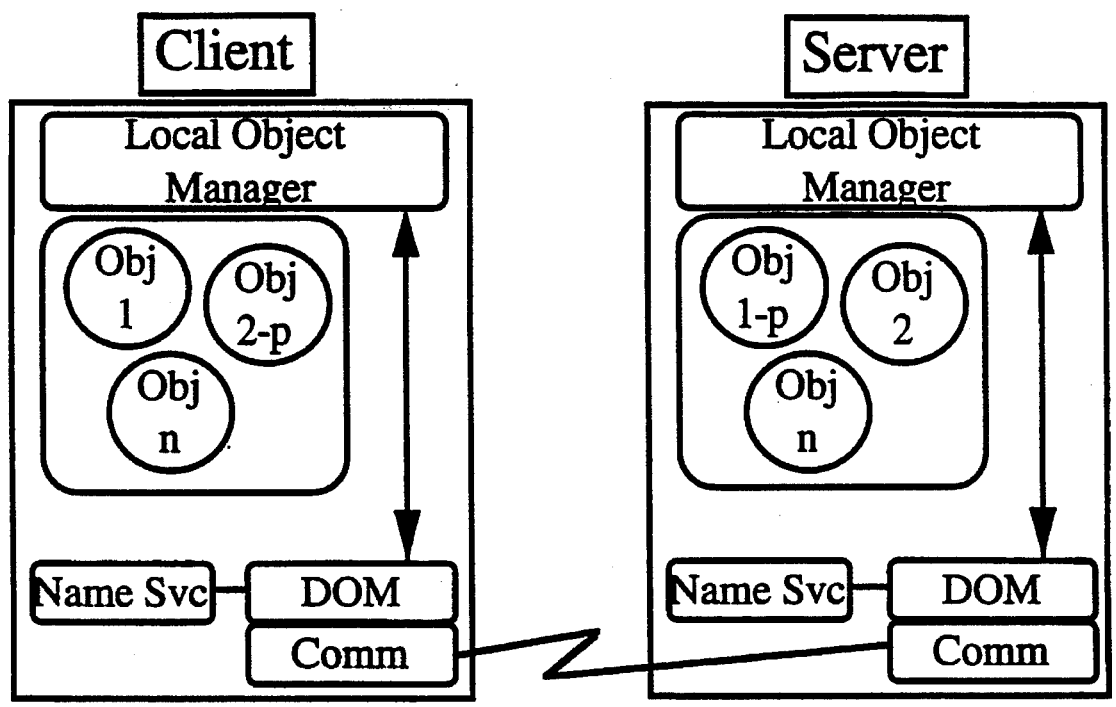
FIG. 21 illustrates distributed execution.

After creating the application partitions, Forté moves the server partitions to the target servers in the environment. Referring to FIGS. 20 and 21, Forté refers to the target configuration definition to see what networks are available and automatically sets up the appropriate network communications to send messages between each set of nodes. Each Forté server may use different communication protocols to communicate with different servers.

Each partition is serviced by a collection of Forté system services that manage communications among partitions, message traffic within each partition and the passing of messages to remote objects. These system services manage all the application service objects on each node.

At this point in the system generation phase, the partitioned application can be run interpretively. Like most 4GLs on the market, Forté converts 4GL source code into a pseudo-code that executes through the Forté interpreter. Since Forté can create shared application service objects, these objects are stored in the repository, and interpretive execution involves repository look-ups. In addition, interpretive execution involves accessing the RDBMS(s) with dynamic SQL. Whereas most of the traditional 4GLs use this approach both for development and deployment, Forté only requires interpretive mode for development. For production applications, Forté offers a code generation option to increase performance.

Each Forté partition can be deployed for production either as an interpreted partition or as a compiled partition. Since the decision to run interpretively or compiled can made on a partition by partition basis, it is possible to have a mixed environment of interpretive and compiled partitions to support, for example, a decision support function as part of a larger application also containing some transaction processing.

Forté offers two code generation strategies to support compiled applications. The first takes the Forté pseudo-code and runs its through a generator to produce standard C++ code for each partition. This C++ code is then compiled with the local C++ compiler for that particular node. The resulting machine code provides a performance benefit over most applications created with a 4GL that run interpretively during deployment. During code generation, Forté resolves all references to the repository so the runtime system does not need to incur the performance penalty of repository look-ups.

The second code generation strategy involves a set of RDBMS specific generators that produce optimized access for each supported RDBMS. For example, the code generator for Sybase produces TransactSQL while the code generator for Oracle 7 produces PL/SQL. In each case, the code generator takes the RDBMS-neutral definition of database access and generates the appropriate strategy for accessing the RDBMS with an optimized performance strategy.

Managing a Partitioned Application

Following system generation, the application is ready for deployment. The first step is to install the client partition(s) on the target desktop machines. The application may call for a mixed environment of PCs and Macs. In that case, Forté would produce a PC version of the client partition and a Mac version. The system administrator would then need to install the appropriate partition on each desktop machine.

Installation also offers the opportunity for replicated partitions. There are two reasons for installing replicated partitions. The first is load balancing. For example, in an SMP (Symmetric Multi Processing) environment, it might make sense to run the RDBMS engine on more than one processor to support a greater load. In this case, the RDBMS access partition should run on each node where an RDBMS engine is located. Forté supports the replication of this RDBMS access partition and provides a router to allow multiple RDBMS engines to service the next RDBMS request in the application queue. The other reason for replication is to provide backup in the event of a node failure. Distributed environments increase the probability that one node in the system will be down at any given point in time. If that node is particularly crucial, it may be appropriate to have a back-up node. For example, a node may provide a key analytical service or image for the user. In these cases it is possible to define a replicated partition as an alternate node that can be accessed in the event that the primary node is unavailable. Forté also provides a router that can access such a backup node.

It has already been mentioned that the distributed runtime environment must provide communications among the application partitions. This concept is foreign to most development tools. Traditional tools rely on the RDBMS to provide the communications link between client and server, thus making the RDBMS an essential part of every application. Forté does not assume that an RDBMS is part of the application, and even if it is, Forté can augment the communications possibilities offered by RDBMSs. This can be especially important when communicating with non-RDBMS servers. Forté provides communications among application partitions with its own distributed messaging system. The messaging system is capable of passing messages among objects within a partition. It is also capable of passing messages between objects located in different partitions. Cross-node messaging is accomplished with the help of proxy objects that are located in the local partition. If an object in the client partition needs to send a message to an object in the server partition, the partitioning algorithm must place a proxy for the server object in the client partition. This strategy enables all client-resident objects to behave as though all server objects were also located on the client. And when a client object sends a message to a server object, the proxy intercepts the message and redirects it to the node where the physical server object is located. This strategy of using proxies eliminates the need to send large objects over the network, and it allows an application to behave the same regardless of where the physical objects are located. This is a critical aspect of a successful application partitioning solution.

Figure 22:
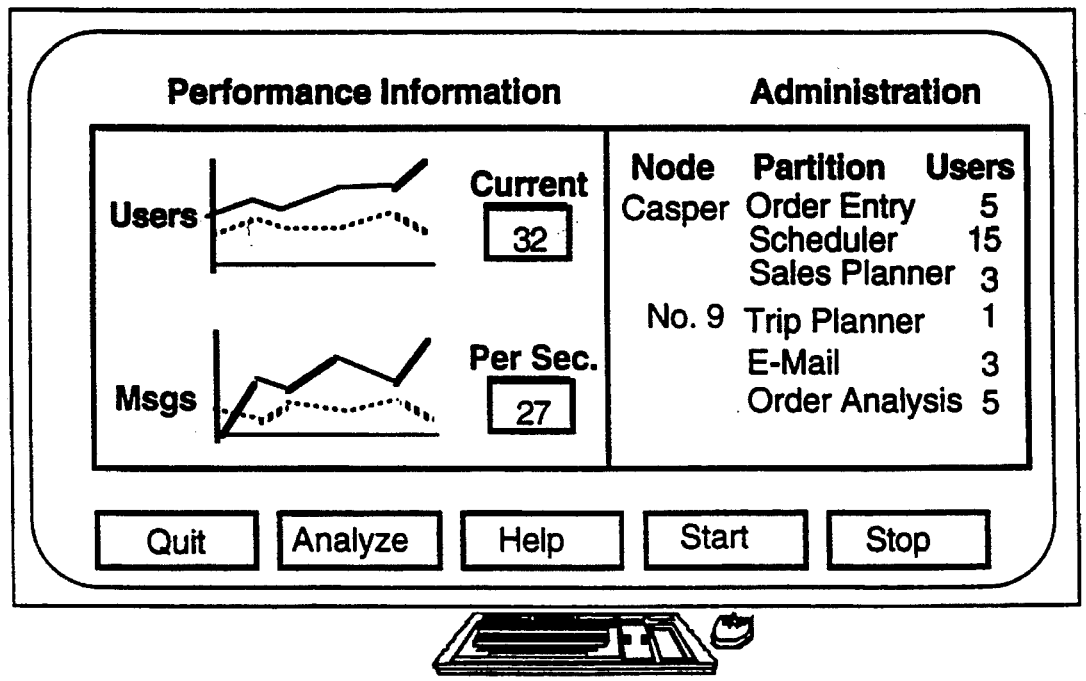
FIG. 22 illustrates using an environment manager for monitoring the distributed application.

Once a distributed application has been deployed, it is very helpful to be able to manage it as a single entity. This means being able to start and stop partitions from a single management interface. It also means being able to monitor performance for the application as a whole, in addition to troubleshooting in the event of performance problems. Where is the time being spent? In communications? Inside a particular partition? This information allows the system administrator to spot performance bottlenecks by viewing the application as a whole. Referring to FIG. 22, Forté provides an Environment Manager interface to provide this information for the distributed application as a whole from a single user interface.

Figure 23:
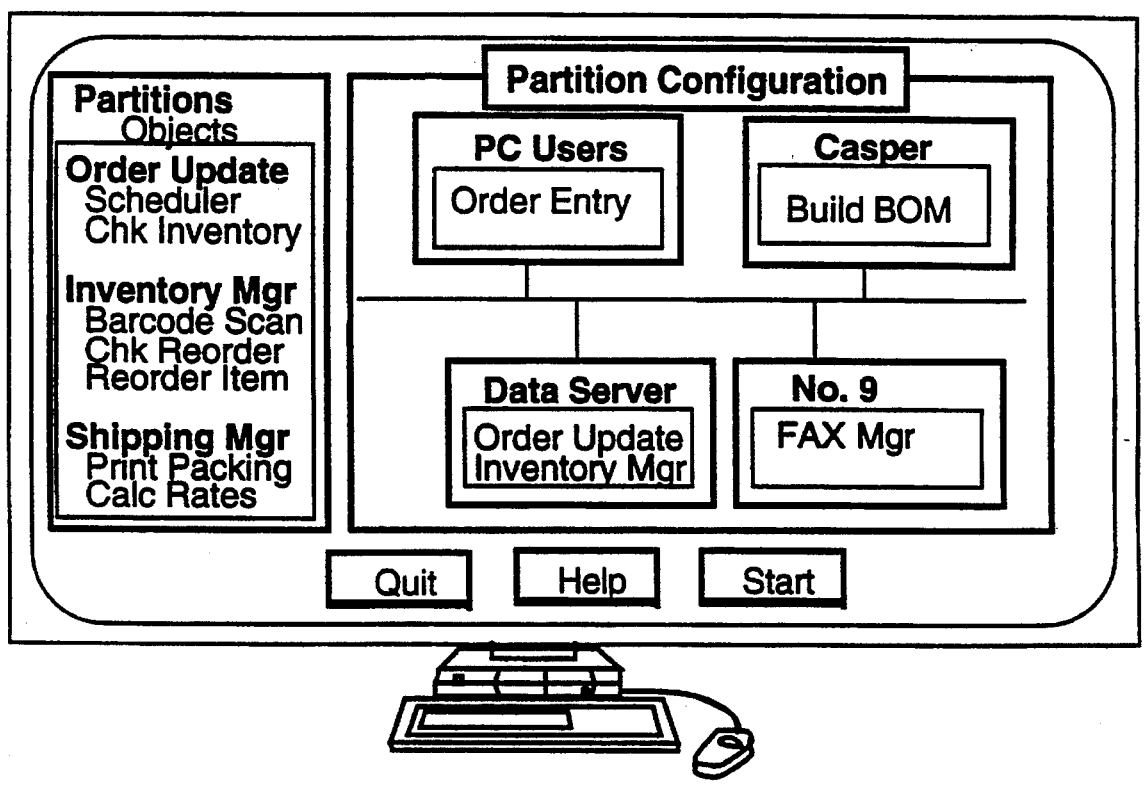
FIG. 23 illustrates a repartitioning interface.

Performance monitoring may suggest a different partitioning scheme. Referring to FIG. 23, Forté provides a drag-and-drop style repartitioning interface to simplify this process. The application administrator can view a schematic diagram of the current partition scheme, and can interact directly with that schematic. Along the left hand side is displayed a listing of all partitions and the service objects included in each partition. To move a service object from one partition to another, the administrator can execute a simple drag-and-drop operation. Likewise, the administrator can move a partition from one node in the schematic to another by dragging-and-dropping the partition name to the desired node. This interface can also be used to drag a partition name from the list on the left to a second node on the schematic in order to set up a replicated partition.

Once the new partitioning scheme has been defined, the administrator can execute a command to generate a new partitioning scheme for the same deployment environment. Both partitioning schemes are stored in the repository for maximum flexibility. The new partitioning scheme then needs to be installed for the changeover.

Partitioning offers an easy way to build distributed applications, to partition the applications for a given deployment environment, to administer all application components as a single entity, and to repartition the application as problems arise or as requirements continue to evolve. Application partitioning is an important strategy for extending the client-server architecture for meeting the demands of mission critical applications that can span the enterprise.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A method of using a computer to design an application program to be executed on at least two interconnected computers, selected from at least two classes of computers, said method comprising selecting a first class of computers comprising a first plurality of computers, each of distinct types, selecting a second class of computers comprising a second plurality of computers, each of distinct types, any one of said second plurality of computers interconnectable with arty one of said first plurality of computers, and preparing a logical application definition for an application program, said logical application definition comprising
defining a first service object,
defining a second service object, and
defining a third service object, such that each of said first second and third service objects can communicate with at least one of the other said service objects,
said first service object capable of execution on substantially any one of said first plurality of computers,
said second service object capable of execution on substantially any one of said second plurality of computers,
said third service object capable of execution on substantially any one of said first plurality of computers and also capable of execution on substantially any one of said second plurality of computers,
but without selecting, at the time of preparing the logical application definition,
a specific one of said first plurality of computers on which to execute said first service object,
a specific one of said second plurality of computers on which to execute said second service object, or
a specific one of said first plurality of computers or a specific one of said second plurality of computers on which to execute said third service object.

2. A method of loading an application program comprising designing an application program using the method of claim 1 and further comprising
providing a heterogeneous environment in which said application can execute, said heterogeneous environment comprising a first computer selected from said first class of computers and a second computer selected from said second class of computers, said second computer interconnected with said first computer, said second computer of a different type than said first computer,
selecting said heterogeneous environment,
loading said first service object on said first computer,
loading said second service object on said second computer, and
loading said third service object on said first computer.

3. A method of executing an application program comprising loading an application program using the method of claim 2 and further comprising executing each of said first, second and third service objects to execute said application program.

4. The method of claim 1 of designing an application program further comprising defining a first means for message transfer for passing a message to transfer information between said first service object and said second service object.

5. The method of claim 1 of designing an application program further comprising defining a first service object request broker, capable of execution on substantially any one of said second plurality of computers, connectable to and in communication with said first service object for relaying communications to and from said first service object.

6. The method of claim 5 of designing an application program further comprising defining a second service object request broker, capable of execution on substantially any one of said first plurality of computers, connectable to and in communication with said second service object for relaying communications to and from said second service object.

7. The method of claim 6 of designing an application program further comprising defining a second means for message transfer for passing a first message from said second or said third service object to said first service object request broker, then forwarding a second, corresponding message to said first service object.

8. The method of claim 7 of designing an application program further comprising defining a means for asynchronously passing a message from one of said second or third service objects to said first service object by sending a message to said first service object request broker, storing said message, then forwarding said message to said first service object.

9. The method of claim 8 of designing an application program further comprising defining said first, second and third service object request brokers and communications between respective ones of said first, second and third service objects and said first, second and third service object request brokers as needed to allow said application program to rim as if each of said first, second and third service objects were in a single physical address space.

10. The method of claim 1 of designing an application program wherein said first class of computers supports a user interface.

11. The method of claim 1 of designing an application program wherein said first class of computers comprises one or more computers selected from the group consisting of a workstation, a personal computer, a laptop computer, a palmtop computer and a personal digital assistant.

12. The method of claim 1 of designing an application program wherein a first computer in said second class of computers comprises a server.

13. The method of claim 11 of designing an application program wherein said second class of computers comprises one or more computers selected from the group consisting of a mainframe, a minicomputer, a superminicomputer, a workstation and a personal computer.

14. A method of loading an application program on interconnected computers selected from at least two classes of computers, said method comprising
selecting a first class of computers comprising a first plurality of computers, each of distinct types,
selecting a second class of computers comprising a second plurality of computers, each of distinct types, any one of said second plurality of computers interconnectable with any one of said first plurality of computers, and
preparing a logical application definition for an .application program, said logical application definition comprising
a first service object,
a second service object, and
a third service object, such that each of said first, second and third service objects can communicate with at least one of the other said service objects,
said first service object capable of execution on substantially any one of said first plurality of computers,
said second service object capable of execution on substantially any one of said second plurality of computers,
said third service object capable of execution on substantially any one of said first plurality of computers and also capable of execution on substantially any one of said second plurality of computers, but without selecting, at the time of preparing the logical application definition, a specific one of said first plurality of computers on which to execute said first service object, a specific one of said second plurality of computers on which to execute said second service object, or a specific one of said first plurality of computers or a specific one of said second plurality of computers on which to execute said third service object, then providing a plurality of heterogeneous environments in each of which said application can execute independently, each heterogeneous environment comprising
a first computer for said heterogeneous environment, selected from said first plurality of computers and
a second computer for said heterogeneous environment, selected from said second plurality of computers and interconnected with said first computer for said heterogeneous environment, selecting a first heterogeneous environment of said plurality of heterogeneous environments,
loading said first service object on said first computer of said first heterogeneous environment,
loading said second service object on said second computer of said first heterogeneous environment, and
selectively loading said third service object on one of said first computer or said second computer of said first heterogeneous environment, and selecting a second heterogeneous environment of said plurality of heterogeneous environments,
loading said first service object on said first computer of said second heterogeneous environment,
loading said second service object on said second computer of said second heterogeneous environment, and
selectively loading said third service object on one of said first computer or said second computer of said second heterogeneous environment, independent of the selective loading of the third service object in said first heterogeneous environment.

15. The method of claim 14 of executing an application program further comprising loading said third service object on said first computer of said and, for each other object, selecting the other object for execution on one of said first heterogeneous environment.

16. The method of claim 15 of executing an application program further comprising moving said third service object from said first computer to said second computer of said first heterogeneous environment.

17. The method of claim 14 of executing an application program further comprising selecting said third service object to execute on said first computer in said first heterogeneous environment and selecting said third service object to execute on said second computer in said second heterogeneous environment without changing the overall operation of said application program in said first compared to said second heterogeneous environments.

18. The method of claim 3 of executing an application program further comprising replicating said third service object as a duplicate third service object and loading said duplicate third service object for execution on said second computer.

19. The method of claim 3 of executing an application program further comprising executing both said third service object and said duplicate third service object to provide load balancing.

20. The method of claim 3 of executing an application program further comprising using said third service object and said duplicate third service object to provide fault tolerance.

21. The method of claim 1 of designing an application program wherein said first and said second computers are respectively a first CPU and a second CPU tightly coupled to said first CPU.

22. The method of claim 1 of designing an application program wherein said first computer is a client and said second computer is a server.

23. The method of claim 1 of designing an application program wherein said first computer is a first server and said second computer is a second server.

24. The method of claim 3 of executing an application program further comprising deactivating said third service object after said duplicate third service object begins execution.

25. The method of claim 3 of executing an application program further comprising moving said third service object from said first computer to said second computer.

26. The method of claim 3 of executing an application program further comprising replicating said third service object on said second computer.

27. A method of loading an application program comprising designing an application program using the method of claim 1 and further comprising providing a heterogeneous environment in which said application can execute, said heterogeneous environment comprising a first computer selected from said first class of computers and a second computer selected from said second class of computers, said second computer interconnected with said first computer, said second computer of a different type than said first computer, selecting said heterogeneous environment, loading said first service object on said first computer, loading said second service object on said second computer, and selectively loading said third service object on one of either said first computer or said second computer.

28. A method of executing an application program comprising loading an application program using the method of claim 31 and further comprising executing each of said first, second and third service objects to execute said application program.

29. The method of claim 1 of designing an application program further comprising defining a third service object request broker, capable of execution on substantially any one of said first plurality of computers and also capable of execution on substantially any one of said second plurality of computers, said third object request broker connectable to and in communication with said third service object for relaying communications to and from said third service object.

30. A method of executing an application program comprising loading an application program using the method of claim 14 and further comprising executing each of said first, second and third service objects to execute said application program in said first heterogeneous environment.

31. A method of executing an application program comprising loading an application program using the method of claim 14 and further comprising executing each of said first, second and third service objects to execute said application program in said second heterogeneous environment.

32. A method of using a computer to execute an application program on at least two interconnected computers, selected from at least two classes of computers, said method comprising selecting a first class of computers comprising a first plurality of computers, each of distinct types, selecting a second class of computers comprising a second plurality of computers, each of distinct types, any one of said second plurality of computers interconnectable with any one of said first plurality of computers, and preparing a logical application definition for an application program, said logical application definition comprising defining a first service object, defining a second service object, and defining a third service object, such that each of said first, second and third service objects can communicate with at least one of the other said service objects, said first service object capable of execution on substantially any one of said first plurality of computers, said second service object capable of execution on substantially any one of said second plurality of computers, said third service object capable of execution on substantially any one of said first plurality of computers and also capable of execution on substantially any one of said second plurality of computers, but without selecting, at the time of preparing the logical application definition, a specific one of said first plurality of computers on which to execute said first service object, a specific one of said second plurality of computers on which to execute said second service object, or a specific one of said first plurality of computers or a specific one of said second plurality of computers on which to execute said third service object, providing a heterogeneous environment in which said application can execute, said heterogeneous environment comprising a first computer selected from said first class of computers and a second computer selected from said second class of computers, said second computer interconnected with said first computer, said second computer of a different type than said first computer, selecting said heterogeneous environment, loading said first service object on said first computer, loading said second service object on said second computer, and loading said third service object on said first computer, then executing each of said first, second and third service objects to execute said application program.

33. The method of claim 32 of executing an application program further comprising moving said third service object from said first computer to said second computer.

34. The method of claim 32 of executing an application program further comprising replicating said third service object on said second computer.

35. The method of claim 32 of executing an application program further comprising not loading said third service object on said first computer, but instead selectively loading said third service object on one of either said first computer or said second computer.

36. The method of claim 32 of executing an application program wherein said first class of computers comprises one or more computers selected from the group consisting of a workstation, a personal computer, a laptop computer, a palmtop computer and a personal digital assistant.

37. The method of claim 32 of executing an application program wherein said second class of computers comprises one or more computers selected from the group consisting of a mainframe, a minicomputer, a superminicomputer, a workstation and a personal computer.

38. The method of claim 32 of executing an application program wherein said first computer is a client and said second computer is a server.

39. The method of claim 32 of executing an application program further comprising defining a first means for message transfer for passing a message to transfer information between said first service object and said second service object.

40. The method of claim 39 of executing an application program further comprising defining a first service object request broker, capable of execution on substantially any one of said second plurality of computers, connectable to and in communication with said first service object for relaying communications to and from said first service object.

41. The method of claim 40 of executing an application program further comprising defining a means for asynchronously passing a message from one of said second or third service objects to said first service object by sending a message to said first service object request broker, storing said message, then forwarding said message to said first service object.

42. A method of using a computer to execute an application program on at least two interconnected computers, selected from at least two classes of computers, said method comprising selecting a first class of computers comprising a first plurality of computers, each of distinct types, selecting a second class of computers comprising a second plurality of computers, each of distinct types, any one of said second plurality of computers interconnectable with any one of said first plurality of computers, and selecting a first service object, selecting a second service object, and selecting a third service object, where each of said first, second and third service objects can communicate with at least one of the other said service objects, said first service object capable of execution on substantially any one of said first plurality of computers, said second service object capable of execution on substantially any one of said second plurality of computers, said third service object capable of execution on substantially any one of said first plurality of computers and also capable of execution on substantially any one of said second plurality of computers, providing a heterogeneous environment comprising a first computer selected from said first class of computers and a second computer selected from said second class of computers, said second computer interconnected with said first computer, said second computer of a different type than said first computer, selecting said heterogeneous environment, loading said first service object on said first computer, loading said second service object on said second computer, and selectively loading said third service object on one of either said first computer or said second computer, then executing each of said first, second and third service objects to execute said application program.

43. The method of claim 42 of executing an application program further comprising moving said third service object from said first computer to said second computer.

44. The method of claim 42 of executing an application program further comprising replicating said third service object on said second computer.

45. The method of claim 42 of executing an application program further comprising loading said third service object on said first computer.

46. The method of claim 42 of executing an application program wherein said first class of computers comprises one or more computers selected from the group consisting of a workstation, a personal computer, a laptop computer, a palmtop computer and a personal digital assistant.

47. The method of claim 42 of executing an application program wherein said second class of computers comprises one or more computers selected from the group consisting of a mainframe, a minicomputer, a superminicomputer, a workstation and a personal computer.

48. The method of claim 42 of executing an application program wherein said first computer is a client and said second computer is a server.

49. The method of claim 42 of executing an application program further comprising defining a first means for message transfer for passing a message to transfer information between said first service object and said second service object.

50. The method of claim 49 of executing an application program further comprising defining a first service object request broker, capable of execution on substantially any one of said second plurality of computers, connectable to and in communication with said first service object for relaying communications to and from said first service object.

51. The method of claim 51 of executing an application program further comprising defining a means for asynchronously passing a message from one of said second or third service objects to said first service object by sending a message to said first service object request broker, storing said message, then forwarding said message to said first service object.

* * * * *

UNITED STATES PATENT AND TRADEMARK OFFICE
CERTIFICATE OF CORRECTION

PATENT NO. : 5,457,797
DATED : October 10, 1995
INVENTOR(S) : Paul Butterworth, Joseph Cortopassi, Chip Fitts It is certified that error appears in the above-identified patent and that said Letters Patent is hereby corrected as shown below:

Column 23, claim 1,
Line 1, change "arty" to -- any --.
Line 9, after "first" insert -- , --.

Column 24, claim 9,
Line 22, change "rim" to -- run --.

Column 24, claim 14,
Line 40, delete "loading" and insert therefore -- using a computer to load --.

Column 25, claim 15,
Lines 42-43, delete "and, for each other object, selecting the other object for execution on one of said".

Column 25, claim 17,
Line 49, change "14" to -- 15 --.

Column 25, claim 19,
Line 62, change "3" to -- 18 --.

Column 25, claim 20,
Line 66, change "3" to -- 18 --.

Column 26, claim 24,
Line 13, change "3" to -- 18 --.

UNITED STATES PATENT AND TRADEMARK OFFICE
CERTIFICATE OF CORRECTION

PATENT NO. : 5,457,797
DATED : October 10, 1995
INVENTOR(S) : Paul Butterworth Joseph Cortopassi, Chip Fitts It is certified that error appears in the above-identified patent and that said Letters Patent is hereby corrected as shown below:

Column 26, claim 28,
Line 43, change "31" to -- 27 --.

Column 30, claim 51,
Line 15, change "of claim 51" to -- of claim 50 --.

Signed and Sealed this

Fourth Day of December, 2001

*Attest:*

*Attesting Officer*

NICHOLAS P. GODICI
*Acting Director of the United States Patent and Trademark Office*